(12) United States Patent
Bradbury et al.

(10) Patent No.: US 7,889,637 B2
(45) Date of Patent: *Feb. 15, 2011

(54) REDUNDANCY IN VOICE AND DATA COMMUNICATIONS SYSTEM

(75) Inventors: Frank K. Bradbury, Saugus, MA (US); Parvez Khan, Reading, MA (US); Steven R. Dunstan, Beverly, MA (US)

(73) Assignee: Starent Networks LLC, Wilmington, DE (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/481,122

(22) Filed: Jun. 9, 2009

(65) Prior Publication Data

US 2010/0067373 A1 Mar. 18, 2010

Related U.S. Application Data

(63) Continuation of application No. 10/638,550, filed on Aug. 11, 2003, now Pat. No. 7,558,193.

(60) Provisional application No. 60/402,761, filed on Aug. 12, 2002.

(51) Int. Cl.
*H04L 1/00* (2006.01)
*H04L 12/26* (2006.01)
*H04L 12/56* (2006.01)
*H04L 12/28* (2006.01)
*H04J 1/02* (2006.01)

(52) U.S. Cl. ............... 370/216; 370/217; 370/397; 370/493; 370/495

(58) Field of Classification Search ............... 370/216, 370/217, 397, 493–495
See application file for complete search history.

(56) References Cited

U.S. PATENT DOCUMENTS

| 5,361,249 A | 11/1994 | Monastra et al. |
| 5,436,886 A | 7/1995 | McGill |
| 5,583,867 A | 12/1996 | Poole |
| 5,631,908 A | 5/1997 | Saxe |
| 5,982,746 A | 11/1999 | Hanson et al. |

(Continued)

FOREIGN PATENT DOCUMENTS

WO   WO 99/52299   10/1999

(Continued)

OTHER PUBLICATIONS

Eng, et al., "An ATM Cross-Connect System for Broadband Trials and Applications," Global Telecommunications Conference, pp. 1454-1460 (1993.

(Continued)

*Primary Examiner*—Chi H Pham
*Assistant Examiner*—Farah Faroul
(74) *Attorney, Agent, or Firm*—Wilmer Cutler Pickering Hale and Dorr LLP

(57) ABSTRACT

Apparatus is used in communicating in a data and voice communication system. The apparatus includes a line card and a crosspoint switch in communication with the line card. The apparatus also includes an accelerator card in communication with the line card and the crosspoint switch. The crosspoint switch is configured to provide a redundant communications path between the line card and the accelerator card.

9 Claims, 27 Drawing Sheets

U.S. PATENT DOCUMENTS

| | | | |
|---|---|---|---|
| 6,052,751 | A | 4/2000 | Runaldue et al. |
| 6,351,466 | B1 | 2/2002 | Prabhakar et al. |
| 6,361,249 | B1 | 3/2002 | Hodgkinson et al. |
| 6,801,975 | B1 | 10/2004 | Young |
| 7,032,135 | B2 | 4/2006 | Harel et al. |
| 7,065,094 | B2 | 6/2006 | Petersen et al. |
| 7,130,276 | B2 | 10/2006 | Chen et al. |
| 7,161,930 | B1 * | 1/2007 | Wang et al. ............... 370/352 |
| 7,324,500 | B1 | 1/2008 | Blackmon et al. |
| 7,599,285 | B2 * | 10/2009 | Zhou et al. ............... 370/217 |
| 2002/0097672 | A1 * | 7/2002 | Barbas et al. ............... 370/216 |
| 2002/0163924 | A1 | 11/2002 | Kim |
| 2003/0200330 | A1 * | 10/2003 | Oelke et al. ............... 709/238 |
| 2003/0215232 | A1 | 11/2003 | Jahn et al. |
| 2004/0114510 | A1 * | 6/2004 | Miller et al. ............... 370/217 |
| 2004/0233922 | A1 | 11/2004 | Van Wageningen et al. |
| 2005/0226148 | A1 | 10/2005 | Assarpour |

FOREIGN PATENT DOCUMENTS

| | | |
|---|---|---|
| WO | WO 00/76260 | 12/2000 |
| WO | WO 01/65783 | 9/2001 |
| WO | PCT/US03/25332 | 2/2004 |

OTHER PUBLICATIONS

Rathgeb, "Redundancy Concepts for a Large ATM Switching Node," International Switching Symposium, vol. 1, pp. 425-433 (1977).

International Search Report from PCT/US03/25332, (2003).

* cited by examiner

HLR – Home Location Register
VLR - Visiting Location Register

IMG - Internet Media Gateway Mechanism
SS7 - Signaling System No. 7

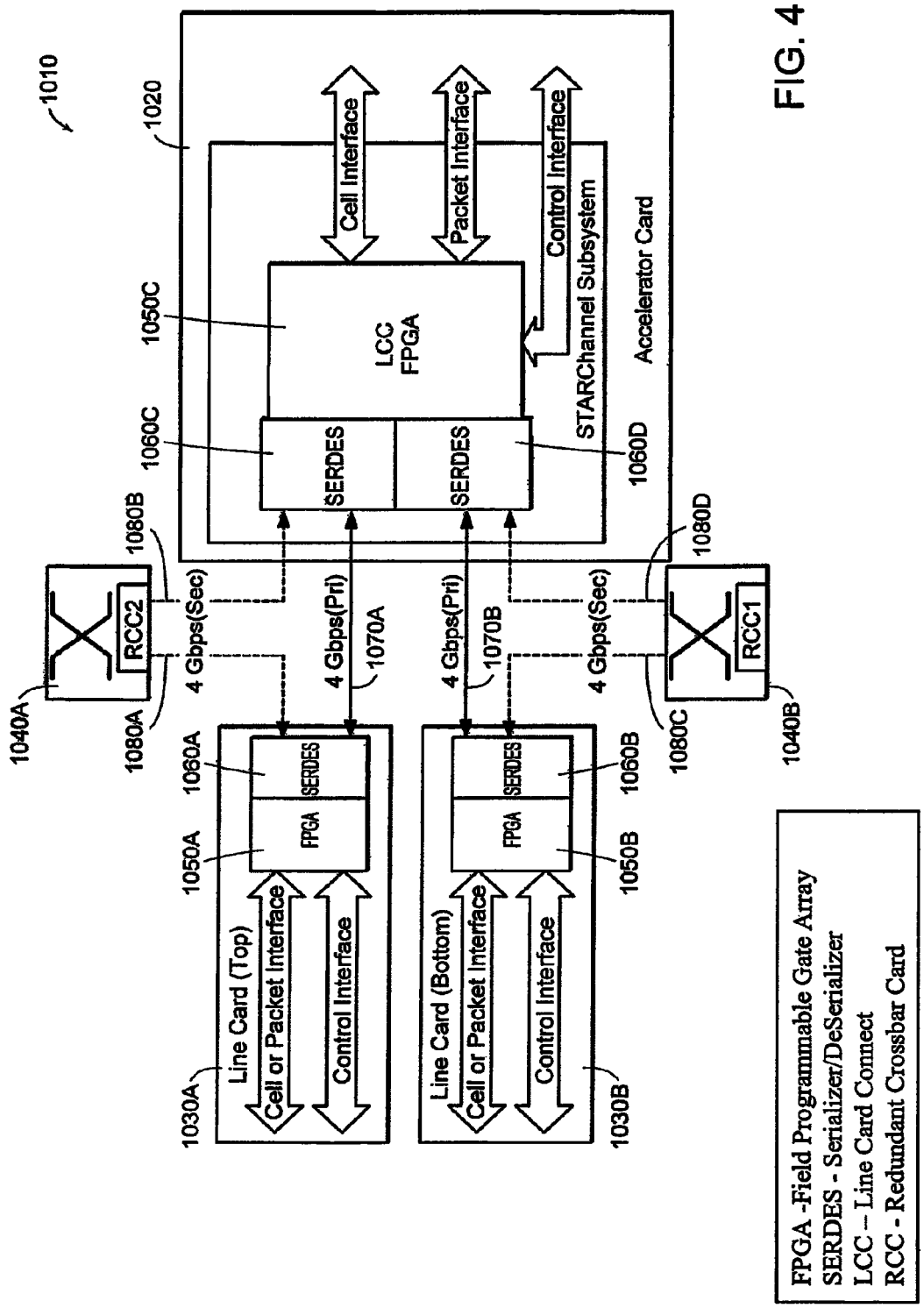

PAC - Packet Accelerator Card
TAC - Telephony Accelerator card

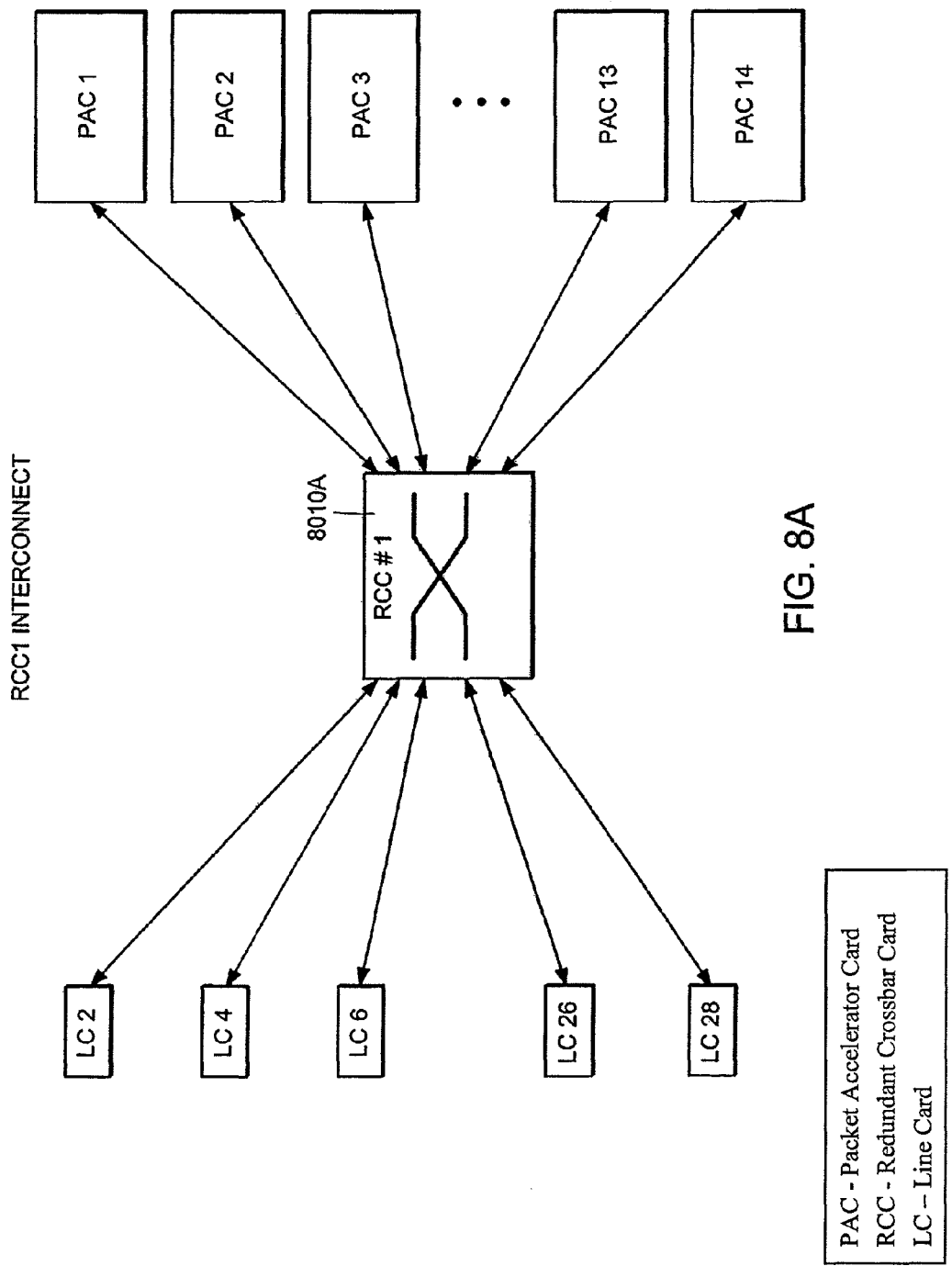

RCC - Redundant Crossbar Card

| Port # | RCC # 1 | RCC # 2 |
|---|---|---|
| 0 | RED2_L4 | RED2_P10 |
| 1 | RED1_L4 | RED1_P10 |
| 2 | RED2_L2 | RED2_P9 |
| 3 | RED1_L2 | RED1_P9 |
| 4 | RED2_P9 | RED2_L1 |
| 5 | RED1_P9 | RED1_L1 |
| 6 | RED2_P10 | RED2_L3 |
| 7 | RED1_P10 | RED1_L3 |
| 8 | RED2_P11 | RED2_L5 |
| 9 | RED1_P11 | RED1_L5 |
| 10 | RED2_P12 | RED2_L7 |
| 11 | RED1_P12 | RED1_L7 |
| 12 | RED2_P8 | RED2_L15 |
| 13 | RED2_P13 | RED2_L9 |
| 14 | RED1_P8 | RED1_L15 |
| 15 | RED1_P13 | RED1_L9 |
| 16 | RED2_P7 | RED2_L13 |
| 17 | RED2_P14 | RED2_L11 |
| 18 | RED1_P7 | RED1_L13 |
| 19 | RED1_P14 | RED1_L11 |
| 20 | RED2_L18 | RED2_P1 |

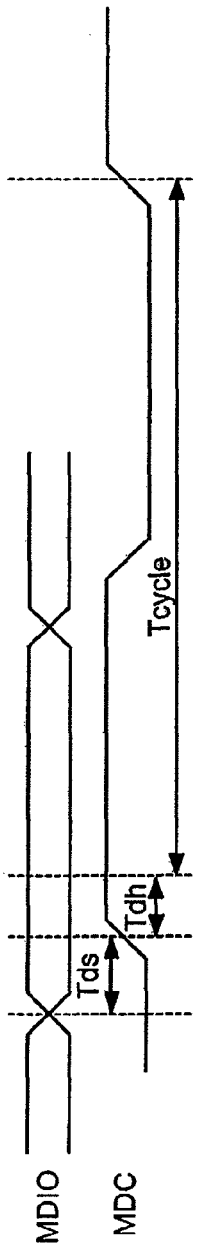

| CYCLE | PRE | ST | OP | PRTAD | DEVAD | TA | ADDRESS/DATA | IDLE |
|---|---|---|---|---|---|---|---|---|
| ADDRESS | 1...1 | 00 | 00 | 0PPPP | 10000 | 10 | 1000AAAAAAAA | Z |
| READINC | 1...1 | 00 | 10 | 0PPPP | 10000 | Z0 | ........DDDDDDDD | Z |
| WRITE | 1...1 | 00 | 01 | 0PPPP | 10000 | 10 | ........DDDDDDDD | Z |
| WRITEINC | 1...1 | 00 | 11 | 0PPPP | 10000 | 10 | ........DDDDDDDD | Z |

| Parameter | Description | Min | Typ | Max | Units |
|---|---|---|---|---|---|
| Tcycle | Cycle Time | 400 | | | ns |
| Tds | Setup time to rising edge of MDC clock | 10 | | | ns |
| Tdh | Hold time from rising edge of MDC clock | 10 | | | ns |

MDIO – Management Data Input/Output
MDC – Management Data Clock
PRTAD – Port Address
DEVAD – Device Address
TA – Turn Around

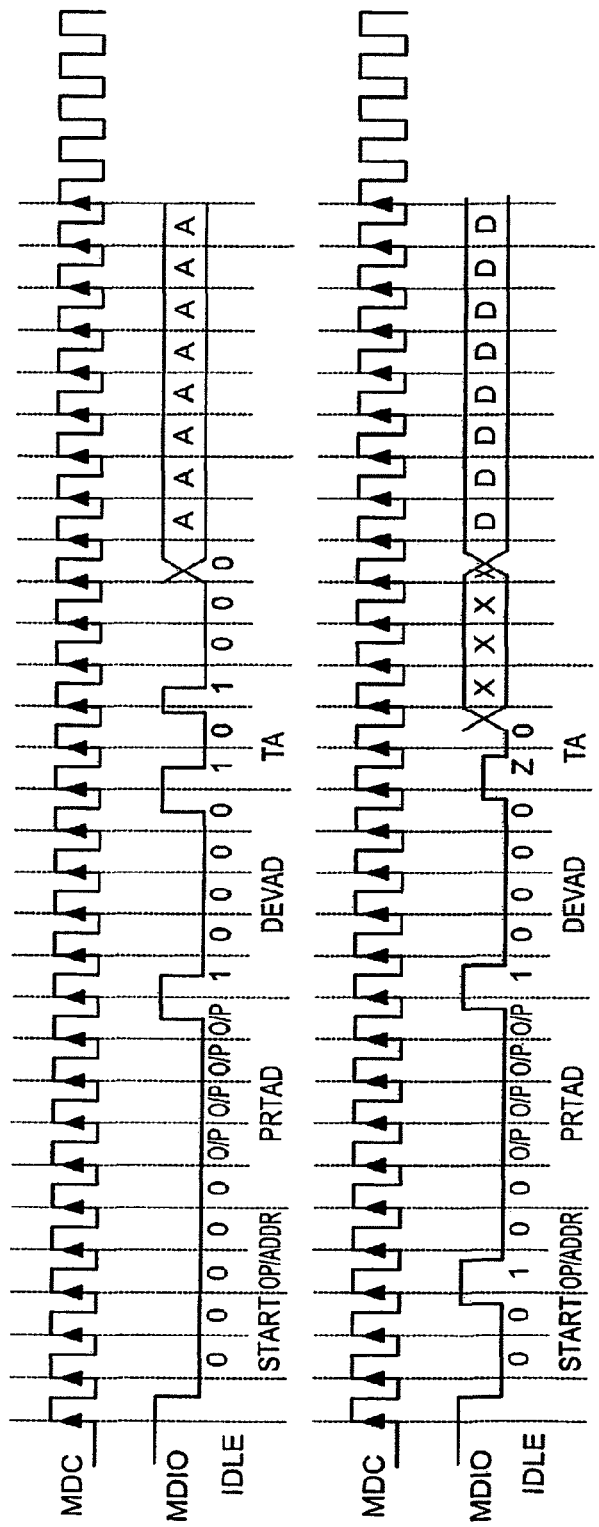
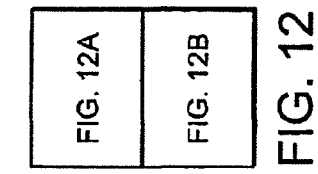
FIG. 12A
VC3002 MDIO ADDRESS/READ SEQUENCE
MDIO – Management Data Input/Output
MDC – Management Data Clock
PRTAD – Port Address
DEVAD – Device Address
TA – Turn Around
FIG. 12

| M | K | E | Amplitude=V(millivolts) | Pre-emphasis=Ve(millivolts) |
|---|---|---|---|---|
| 8 | 12 | 4 | 338 | 113 |
| 8 | 12 | 2 | 338 | 56 |
| 8 | 9 | 4 | 253 | 113 |
| 8 | 9 | 2 | 253 | 56 |
| 8 | 6 | 4 | 169 | 113 |
| 8 | 6 | 2 | 169 | 56 |
| 6 | 12 | 4 | 450 | 150 |
| 6 | 12 | 2 | 450 | 75 |
| 6 | 9 | 4 | 338 | 150 |
| 6 | 9 | 2 | 338 | 75 |
| 6 | 6 | 4 | 225 | 150 |
| 6 | 6 | 2 | 225 | 75 |
| 4 | 12 | 4 | 675 | 225 |
| 4 | 12 | 2 | 675 | 113 |
| 4 | 9 | 4 | 506 | 225 |
| 4 | 9 | 2 | 506 | 113 |
| 4 | 6 | 4 | 338 | 225 |
| 4 | 6 | 2 | 338 | 113 |

FIG. 14

| Function | I2C addr. | Part # | Description |
|---|---|---|---|
| Slave Device | 0x4B | XC2S15-5VQ100C | Xilinx Spartan II FPGA |
| ID PROM | 0x52 | AT24C164-10SC-2.7 | ID PROM |
| Thermal Sensor | 0x2E | LM87 | Thermal sensor and voltage monitor |

FIG. 16

ID – Identification
PROM – Programmable Read-Only Memory

| Port | bit | Name | Connection | Function |
|---|---|---|---|---|
| BD_LEDS | 0 | LED_GOOD | Front Panel | Low if board status is good |
| BD_LEDS | 1 | LED_BAD | Front Panel | Inverse of LED_STAT_GOOD |
| BD_LEDS | 2 | LED_ACT | Front Panel | Low if board is active |
| BD_RST | 0 | RST_THERM | LM87 | Active low, resets temperature sensor |
| BD_RST | 1 | RST_VSC3002 | VSC3002 | Active low, resets VSC3002 |
| BD_STAT | 0 | BD_PRES | Latch | Latch status for board present |
| BD_STAT | 1 | VSC3002_RDYN | VSC3002 | Active Low, Indicates VSC3002 is out of reset and has been initialized correctly |
| BD_STAT | 2 | VSC3002_SFTER | VSC3002 | Active Low, Indicates VSC3002 is out of reset and an unrecoverable initialization error has occured |
| BD_INT | 0 | INT_TEMP | LM87 | Temperature interrupt |
| BD_INT | 1 | INT_VOLT | LM87 | Voltage warning interrupt |
| BD_INT | 2 | VSC3002_INT | VSC3002 | Interrupt From VC3002 Crosspoint |

FIG. 17

| Function | 6 | 5 | 4 | 3 | 2 | 1 | 0 |
|---|---|---|---|---|---|---|---|
| Board Related | 0x00 | S/C | | | | | |
| Board Status | 0x00 | 0 | Status registers | | | | |
| Board Control | 0x00 | 1 | Control registers | | | | |
| SMB Interface | 0x01 | S/C | | | | | |
| SMB Status | 0x01 | 0 | Status registers | | | | |
| SMB Control | 0x01 | 1 | Control registers | | | | |
| Add-on space | 0x10 | Type | | | | | |
| JTAG interface | 0x10 | 0x00 | JTAG registers | | | | |
| MII interface | 0x10 | 0x10 | MII registers | | | | |
| User Space | 0x11 | Type | | | | | |
| Diag. Mailbox | 0x11 | 0x00 | 0 | status R/W | | | |
| | 0x11 | 0x00 | 1 | SCB read | | | |
| Diag. Control | 0x11 | 0x01 | 0 | control R/W | | | |
| | 0x11 | 0x01 | 1 | I2C read only | | | |

FIG. 18

SCB - System Control Bus
JTAG - Joint Test Action Group
MII - Media Independent Interface
SMB - System Management Bus

| FIG. 19A-1 |
|---|
| FIG. 19A-2 |

FIG. 19A

| NAME | ADDR | BIT | DEF. | R/W | Description |
|---|---|---|---|---|---|
| | | | | | BOARD STATUS |
| IMAG_VER | 0X00 | [7:0] | | R | Slave FPGA image version number |
| IMAG_REV | 0X01 | [3:0] | | R | Slave FPGA image revision number |
| BD_SLOTID | 0X02 | [5:0] | | R | Board Slot ID from mid-plane |
| | 0X02 | 6 | | R | SCB bus master |
| BD_STAT | 0X03 | | 0X00 | R | Board Status from input pins |
| | | 0 | 0 | R | Latch status |
| VC3002_RDYN | | 1 | 0 | R | Active Low, Indicates VSC3002 is out of reset and has been initialized correctly |
| VC3002_SFTER | | 2 | 0 | R | Active Low, Indicates VSC3002 is out of reset and an unrecoverable initialization error has occured |
| BD_INT | 0X04 | | 0X00 | R | Board interrupts from input pins |
| | | 0 | 0 | R | Temperature sensor interrupt |
| | | 1 | 0 | R | Voltage warning interrupt |
| VC3002_INT | | 2 | 0 | R | Velio VC3002 interrupt |

FIG. 19A-1

SCB - System Control Bus
VC - Velio Communications

| BOARD CONTROL | | | | |
|---|---|---|---|---|
| BD_LEDS | 0X10 | 0XFF | | Board LED pin outputs |
| LED_GOOD | | 0 | R/W | 1 = BD is good, 0 = no indication |
| LED_BAD | | 1 | R/W | 1 = BD is bad, 0 = no indication |
| LED_ACT | | 2 | R/W | 1 = BD is active |
| LED_BYP | | 3 | R/W | 1 = BD is in bypass |
| BD_RST | 0X11 | 0XFF | | Board Reset pin outputs |
| RST_THERM | | 0 | R/W | Temp. sensor reset |
| RST_VC3002 | | 1 | R/W | Velio VC3002 Reset |
| RST_CARD | | 2 | R/W | Reset to Card reset excluding slave |
| SCB STATUS | | | | |
| HEAD_ERR | 0X20 | | R/W | Header error codes, write 0 to clear |
| BAD_HFORM | | 0 | R/W | An unexpected STOP occurred |
| BAD_HPEC | | 1 | R/W | Header PEC miscompare |
| BAD_HLEN | | 2 | R/W | Invalid length field |
| BAD_HBUS | | 3 | R/W | Invalid bus field |
| SCB_ERR | 0X21 | | R/W | SCB errors codes, write 0 to clear |
| | | 0 | R/W | PEC error |
| | | 1 | R/W | Time-out SCB frame length |
| | | 2 | R/W | Time-out SCB hold clock |
| | | 3 | R/W | SCB Invalid format |
| I2C_ERR | 0X22 | | R/W | I2C error codes, write 0 to clear |

FIG. 19A-2

SCB - System Control Bus

| | | 0 | 0 | R/W | I2C bus busy |
|---|---|---|---|---|---|
| | | 1 | 0 | R/W | I2C invalid format |
| | | 2 | 0 | R/W | I2C NACK |
| SCB CONTROL |||||| 
| SCB_SEL | 0X30 | | | | SCB master over-ride |
| | | 0 | 0 | R/W | Enables master bus override |
| | | 1 | 0 | R/W | Selects master bus 0 or 1 |
| SCB_FUNC | 0X31 | | 0X00 | R/W | Enables various buses and functions |
| | | 0 | 0 | R/W | Enable I2C / SMB bus 1 |
| | | 1 | 0 | R/W | Enable I2C / SMB bus 2 |
| | | 2 | 0 | R/W | Enable JTAG interface |
| | | 3 | 0 | R/W | Enable MII interface |
| SCB_CONF | 0X31 | [7:0] | 0X00 | R/W | SCB Configuration |
| | | 0 | 0 | R/W | Disable SCB filtering |
| | | 1 | 0 | R/W | Disable PEC checking |
| | | 2 | 0 | R/W | If busy, NACK =0, timeout =1 |
| SCB_SPD | 0X32 | [7:0] | 0X00 | R/W | Sets speed for I2C buses |
| | | [1:0] | 00 | R/W | Speed for bus 0, 00 = 100k, 10 = 1M |
| | | [3:2] | 00 | R/W | Speed for bus 1, 01 = 400k, 11=3.2M |
| SCB_INTMSK | 0X33 | [7:0] | 00 | R/W | Interrupt mask for interrupt port. |
| SCB_ADDR | 0X34 | [6:0] | 0X48 | R/W | I2C address for slave device |
| JTAG SPACE |||||| 
| JTAG_ERR | 0X40 | | | | Stores JTAG add-on error info. |
| | | 0 | 0 | R/W | Unexpected STOP |
| MII SPACE |||||| 
| | | | | | |
| USER SPACE |||||| 
| DIAG_TOUT | 0x60 | [7:0] | 00 | R/W | WRITING TO THIS REGISTER CAUSES TIMEOUT |

FIG. 19B

SCB - System Control Bus
JTAG - Joint Test Action Group
MII - Media Independent Interface
SMB - System Management Bus

| Port # | 0 | 1 | 71 | ALL |
|---|---|---|---|---|
| Register | Output Port Register Address | | | |
| GXBCFG0 | 000h | 008h | 238h | 7F8h |
| GXBCFG1 | 001h | 009h | 239h | 7F9h |
| GXBSOL0 | 002h | 00Ah | 23Ah | 7FAh |
| GXBSOL1 | 003h | 00Bh | 23Bh | 7FBh |
| GXBSOC | 004h | 00Ch | 23Ch | 7FCh |
| | | | | |
| Register | Input Port Register Address | | | |
| GXBDR0 | 800h | 808h | A38h | FF8h |
| GXBDR1 | 801h | 809h | A39h | FF9h |
| GXBSI | 802h | 80Ah | A3Ah | FFAh |
| | | | | |
| Register | Global Register Address | | | |
| GXBIV | FFBh | | | |
| GXBIS | FFCh | | | |
| GXBCSR | 7F0h | | | |
| PHY ID | 7F4-7h | | | |
| | | | | |

FIG. 20

| FIG. 21A |
| FIG. 21B |

FIG. 21

SCB - System Control Bus
RCC - Redundant Crossbar Card
PAC - Packet Accelerator Card
LC – Line Card
SPC - Switch Processing Card

| Signal Name | # pins | Description |
|---|---|---|
| Redundant Data Path between PAC and RCC and LC and RCC | | |
| REDn_Rn_Pn | 56 | Redundant data path from RCCn to PACn |
| REDn_Pn_Rn | 56 | Redundant data path from PACn to RCCn |
| REDn_Rn_Ln | 56 | Redundant data path from RCCn to LCn |
| REDn_Ln_RCCn | 56 | Redundant data path from LCn to RCCn |
| Control Path to SPC | | |
| I2C_Sn_C | 2 | System control bus clocks |
| I2C_Sn_D | 2 | System control bus data |
| SPC_ACTIVE | 1 | Selects which SPC is master |
| PWR_L | 1 | Power control |
| Misc connections | | |
| RCC_SLOT_ID | 6 | Slot ID pins, unique for each slot |
| PRES_Rn_L | 1 | Card Presence detect |

FIG. 21A

PAC - Packet Accelerator Card
LC – Line Card
RCC - Redundant Crossbar Card

SCB - System Control Bus
ID – Identification
PROM - Programmable Read-Only Memory

REDUNDANCY IN VOICE AND DATA COMMUNICATIONS SYSTEM

CROSS-REFERENCE TO RELATED APPLICATIONS

This application is a continuation of U.S. patent application Ser. No. 10/638,550, now U.S. Pat. No. 7,558,193 which was filed on Aug. 11, 2003, which claims priority to U.S. Provisional Application No. 60/402,761, filed Aug. 12, 2002, each of which is hereby incorporated by reference in its entirety.

BACKGROUND

This invention relates to redundancy in voice and data communications systems.

An element of a communications system such as a wireless communication system can fail and can require replacement. The failure of the element and the replacement of the element typically require shutdown of the system, which can be highly expensive and time-consuming due to the long time intervals necessary to bring the system to a stable condition following the shutdown.

If there is no redundancy in the event that the element becomes disabled, or otherwise fails to perform its tasks, the performance and reliability of communications can be compromised. One approach to redundancy is to designate a master element and one or more candidates that would take over as master in a sequential fashion when the existing master fails. That method, although useful for its intended purposes in providing some degree of redundancy, can be cumbersome to configure. The master and the candidate elements may have to be manually selected when the communications system is set up. Another disadvantage is that, once all the candidate elements are exhausted due to multiple failures, the network would again be without a master, causing deterioration or disruption in communications such as wireless communication.

Although the particular application may vary, the components of a wireless communication system are generally similar, as described in more detail below. For example, a wireless communication system usually includes a radio terminal or mobile station, a radio base station, a switch or network control device, often referred to as a mobile telephone switching office (MTSO), and a network to which the wireless communications system provides access, such as the Public Switched Telephone Network (PSTN).

The various wireless communication applications use any of multiple modulation techniques for transmitting information to efficiently utilize the available frequency spectrum. For example, frequency division multiple access (FDMA), time division multiple access (TDMA), and code division multiple access modulation techniques are used to build high-capacity multiple access systems. Telecommunication systems designed to communicate with many mobile stations occupying a common radio spectrum are referred to as multiple access systems.

For example, in an FDMA analog cellular system, such as an AMPS analog cellular radio system, the available frequency spectrum is divided into a large number of radio channels, e.g., pairs of transmit and receive carrier frequencies, each of which corresponds to a message transmission channel. The bandwidth of each transmit and receive frequency channel is narrowband, generally 25-30 kHz. Thus, the FDMA system permits information to be transmitted in a bandwidth comparable to the bandwidth of the transmitted information, such as a voice signal. The cellular service area in the FDMA system is generally divided into multiple cells, each cell having a set of frequency channels selected so as to help reduce co-channel interference between cells.

Frequency division is often combined with time division so that transmission circuits are distinguished in both the frequency and time domain, e.g., in a FD/TDMA system. In a digital FD/TDMA (commonly referred to as TDMA) cellular system, a narrowband frequency channel is reformatted as a digital transmission path which is divided into a number of time slots. The data signals from different calls are interleaved into assigned time slots and sent out with a correspondingly higher bit rate, the time slot assigned to each mobile station being periodically repeated. Although the TDMA bandwidth may be somewhat larger than the FDMA bandwidth, a bandwidth of approximately 30 kHz is generally used for AMPS-D digital TDMA cellular systems.

Another approach to cellular multiple access modulation is CDMA. CDMA is a spread spectrum technique for transmitting information over a wireless communication system in which the bandwidth occupied by the transmitted signal is significantly greater than the bandwidth required by the baseband information signal (e.g., the voice signal). Thus, CDMA modulation spectrally spreads a narrowband information signal over a broad bandwidth by multiplex modulation, using a codeword to identify various signals sharing the same frequency channel. Recognition of the transmitted signal takes place by selecting the spectrally-coded signals using the appropriate codeword. In contrast to the narrowband channels of approximately 30 kHz used in FDMA and TDMA modulation techniques, a CDMA system generally employs a bandwidth of approximately 1.25 MHz or greater.

Typically, the mobile communication systems described above are arranged hierarchically such that a geographical "coverage area" is partitioned into a number of smaller geographical areas called "cells." Referring to FIG. 1, each cell is preferably served by a Base Transceiver Station ("BTS") 102a. Several BTS 102a-n are centrally administered via fixed links 104a-n by a Base Station Controller ("BSC") 106a. The BTSs and BSC are sometimes collectively referred to as the Base Station Subsystem ("BS") 107. Several BSCs 106b-n may be centrally administered by a Mobile Switching Center ("MSC") 110 via fixed links 108a-n.

MSC 110 acts as a local switching exchange (with additional features to handle mobility management requirements, discussed below) and communicates with the phone network ("PSTN") 120 through trunk groups. U.S. mobile networks include a home MSC and a serving MSC. The home MSC is the MSC corresponding to the exchange associated with a Mobile Subscriber (also referred to above as a mobile station or "MS") 114; this association is based on the phone number, such as the area code, of the MS. Examples of an MS include a hand-held device such as a mobile phone, a PDA, a 2-way pager, or a laptop computer, or Mobile Unit Equipment, such as a mobile unit attached to a refrigerator van or a rail car, a container, or a trailer.

The home MSC is responsible for a Home Location Register ("HLR") 118 discussed below. The serving MSC, on the other hand, is the exchange used to connect the MS call to the PSTN. Consequently, sometimes the home MSC and serving MSC functions are served by the same entity, but other times they are not (such as when the MS is roaming). Typically, a Visiting Location Register ("VLR") 116 is co-located with the MSC 110 and a logically singular HLR is used in the mobile network (a logically singular HLR may be physically distributed but is treated as a single entity). As will be explained below, the HLR and VLR are used for storing subscriber information and profiles.

Radio channels 112 are associated with the entire coverage area. As described above, the radio channels are partitioned into groups of channels allocated to individual cells. The channels are used to carry signaling information to establish call connections and related arrangements, and to carry voice or data information once a call connection is established.

Mobile network signaling has at least two significant aspects. One aspect involves the signaling between an MS and the rest of the network. In the case of 2G ("2G" is the industry term used for "second generation") and later technology, this signaling concerns access methods used by the MS (such as TDMA or CDMA), pertaining to, for example, assignment of radio channels and authentication. A second aspect involves the signaling among the various entities in the mobile network, such as the signaling among the MSCs, BSCs, VLRs, and HLRs. This second part is sometimes referred to as the Mobile Application Part ("MAP") especially when used in the context of Signaling System No. 7 ("SS7"). SS7 is a common channel signaling system by which elements of the telephone network exchange information, in the form of messages.

The various forms of signaling (as well as the data and voice communication) are transmitted and received in accordance with various standards. For example, the Electronics Industries Association ("EIA") and Telecommunications Industry Association ("TIA") help define many U.S. standards, such as IS-41, which is a MAP standard. Analogously, the CCITT and ITU help define international standards, such as GSM-MAP, which is an international MAP standard. Information about these standards is well known and may be found from the relevant organizing bodies as well as in the literature, see, e.g., Bosse, SIGNALING IN TELECOMMUNICATIONS NETWORKS (Wiley 1998).

To deliver a call from an MS 114, a user dials the number and presses "send" on a cell phone or other MS. The MS 114 sends the dialed number indicating the service requested to the MSC 110 via the BS 107. The MSC 110 checks with an associated VLR 116 (described below) to determine whether the MS 114 is allowed the requested service. The serving MSC routes the call to the local exchange of the dialed user on the PSTN 120. The local exchange alerts the called user terminal, and an answer back signal is routed back to the MS 114 through the serving MSC 110 which then completes the speech path to the MS. Once the setup is completed the call may proceed.

To deliver a call to an MS 114, (assuming that the call originates from the PSTN 120) the PSTN user dials the MS's associated phone number. At least according to U.S. standards, the PSTN 120 routes the call to the MS's home MSC (which may or may not be the MSC serving the MS). The MSC then interrogates the HLR 118 to determine which MSC is currently serving the MS. This also acts to inform the serving MSC that a call is forthcoming. The home MSC then routes the call to the serving MSC. The serving MSC pages the MS via the appropriate BS. The MS responds and the appropriate signaling links are set up.

During a call, the BS 107 and MS 114 may cooperate to change channels or BTSs 102, if needed, for example, because of signal conditions. These changes are known as "handoffs," and they involve their own types of known messages and signaling.

FIG. 2 shows in more detail the signaling and user traffic interfaces between a BS 107 and an MSC 110 in a CDMA mobile network. The BS 107 communicates signaling information using an SS7-based interface for controlling voice and data circuits known as the "A1" interface. An interface known as "A2" carries user traffic (such as voice signals) between the switch component 204 of the MSC and the BS 107. An interface known as "A5" is used to provide a path for user traffic for circuit-switched data calls (as opposed to voice calls) between the source BS and the MSC. Information about one or more of A1, A2, A5 may be found in CDMA Internetworking—Deploying the Open-A Interface, Su-Lin Low, Ron Schneider, Prentice Hall, 2000, ISBN 0-13-088922-9.

Mobile communications providers are supplying newer services, e.g., "data calls" to the Internet. For at least some of these services, MSCs are not cost effective because they were primarily designed for voice calls. Integration of new services into the MSC is difficult or infeasible because of the proprietary and closed designs used by many MSC software architectures. That is, the software logic necessary to provide the services is not easy to add to the MSC 110. Often, a switch adjunct is used to provide such services. For example, an Inter-Working Function ("IWF") is an adjunct to route a data call to the Internet. Either approach—integrating functionality into the MSC or adding a trunk-side adjunct—involves the MSC in the delivery of service. Integrating new services via MSC design changes or through trunk-side adjuncts can increase network congestion at the MSC and consume costly MSC resources.

Data calls typically make use of the Internet, which is an example of a packet-switching medium. A packet-switching medium operates as follows. A sequence of data is to be sent from one host to another over a network. The data sequence is segmented into one or more packets, each with a header containing control information, and each packet is routed through the network. A common type of packet switching is datagram service, which offers little or no guarantees with respect to delivery. Packets that may belong together logically at a higher level are not associated with each other at the network level. A packet may arrive at the receiver before another packet sent earlier by the sender, may arrive in a damaged state (in which case it may be discarded), may be delayed arbitrarily (notwithstanding an expiration mechanism that may cause it to be discarded), may be duplicated, and may be lost.

At least one wireless Internet system has been proposed that provides reliable access to tens of megahertz of bandwidth across a wide geographic area, using local wireless transceiver technology (e.g., in a nanocell system). In contrast to the cellular wireless voice system, which relies on tens or hundreds of cells in a region, the local wireless transceiver system relies on thousands or tens of thousands of transceivers in the region. In such a system, each transceiver may cover, e.g., 0.05 square kilometers, which is about one-hundredth the coverage of a conventional cell. High spatial reuse of the radio frequency (RF) spectrum allows the local wireless transceiver system to accommodate many more active devices at a given data rate than a conventional cell system. In addition, since users are closer to access points, the local wireless transceiver system accommodates lower-power transmissions. The local wireless transceiver system can support large numbers of devices, running at high speeds, with relatively little drain on the devices' batteries.

For example, in a citywide local wireless transceiver system network of 10,000 transceiver access points (cell centers), if each point provides its users with 1-Mb/s collective throughput, 10 active devices per transceiver can be supported at 100 kb/s each, which amounts to 100,000 active devices in the city. If each device is active 10 percent of the time, such a network can support a million devices, although some accounting would need to be made for bandwidth consumed by overhead for channel access, handoffs, and any provision for asymmetric traffic (e.g., in which more bits flow toward a device than from it).

Each local wireless transceiver system access point may be or resemble access points for wireless local area network (LAN) technology such as IEEE 802.11. An asynchronous digital subscriber line (ADSL), or a cable modem line may be used to provide a link between each access point and the Internet (a wireless link may be used as well or instead). With respect to the siting of access devices, since each device requires electrical power and is preferably elevated for adequate radio frequency coverage, sites on utility poles and buildings are typical candidates, with the high-speed neighborhood Internet access infrastructure serving as a backbone.

In communications systems as described above, it is desirable to provide redundancy without excessive complexity.

SUMMARY

In an aspect of the invention, apparatus is used in communicating in a data and voice communication system. The apparatus includes a line card and a crosspoint switch in communication with the line card. The apparatus also includes an accelerator card in communication with the line card and the crosspoint switch. The crosspoint switch is configured to provide a redundant communications path between the line card and the accelerator card.

Implementations of the invention may provide one or more of the following advantages. A chassis can be provided in which any card regardless of position within the chassis can serve as a backup for any like card in the chassis.

Other advantages and features will become apparent from the following description, including the drawings, and from the claims.

BRIEF DESCRIPTION OF THE DRAWINGS

FIGS. 1-2, 3A-3B, 4 are block diagrams of communications systems.

FIGS. 8A-8B are diagrams of crossbar connections.

FIGS. 9A-9B illustrates a chart of crossbar connections.

FIG. 11 illustrates bitstreams for register access.

FIGS. 12A-B and 13 illustrate crossbar card timing diagrams.

FIG. 14 illustrates crossbar card control values.

FIG. 16 illustrates a chart of components of a crossbar card.

FIG. 17 illustrates a chart of control and status lines of a crossbar card.

FIG. 18 illustrates a functional memory map of a crossbar card.

FIGS. 19A-1, 19A-2, and 19B illustrates registers of a crossbar card.

FIG. 20 illustrates a memory map of a crosspoint switch of a crossbar card.

FIGS. 21A-21B illustrates a chart of midplane signal connections of a crossbar card.

DETAILED DESCRIPTION

Figure 6:
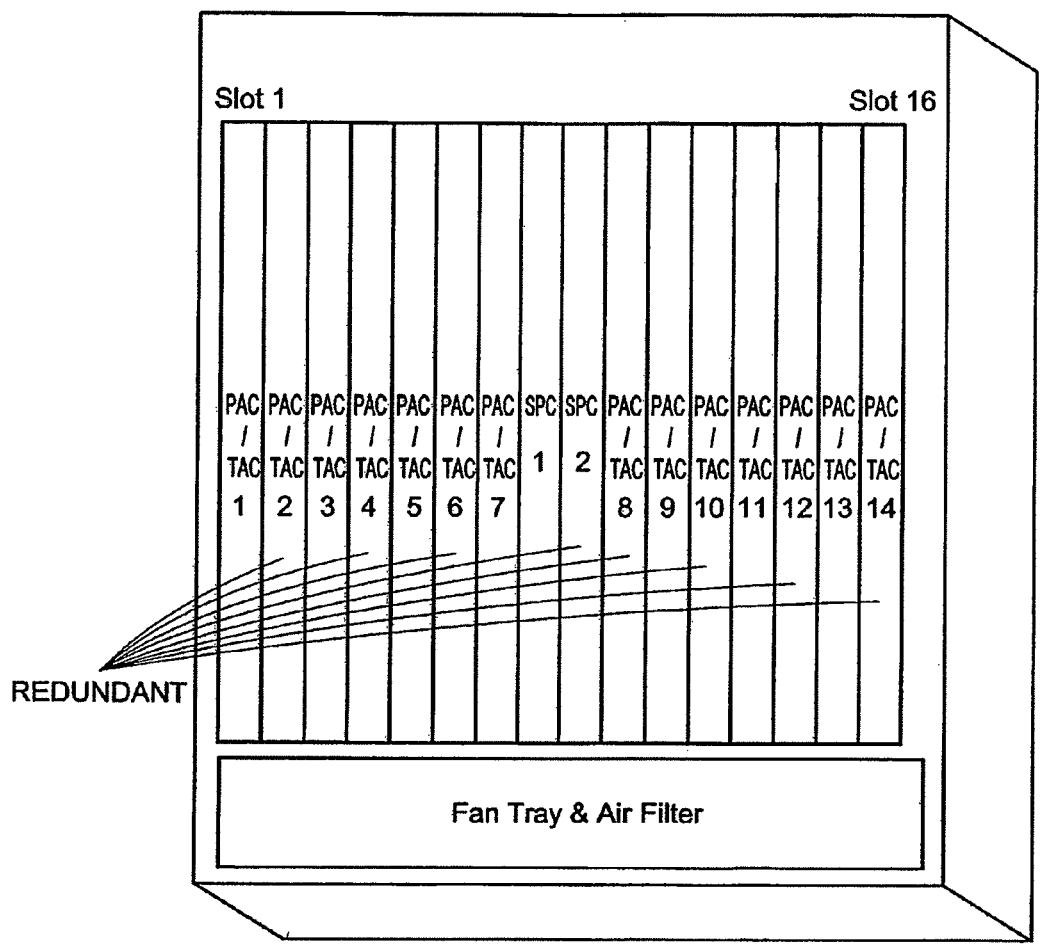
FIG. 6 is a diagram of a communications system chassis.

In a communication system, redundancy may be implemented in a fixed configuration manner. For example, in a 16 slot chassis as shown in FIG. 6, slot #2 may be redundant for slot #1, and slot #4 may be redundant for slot #3, with the rest of the slots being configured in a similar pattern. A limitation of this implementation is that cards are placed in certain predetermined slots to provide redundancy; predetermined signals connect datapaths between the active and redundant cards. Providing such connections for every card in the chassis to every other card in the chassis would create unworkable complexity.

As described in more detail below, redundancy can provided in a workable way in a communications system that has a chassis having a high speed cross-point switch in a redundant datapath such that any card in the chassis can be connected to any other card in the chassis. Accordingly, a card can be plugged in any slot and be used as a redundant card. The cross-point switch is programmed when needed such that the redundant path is connected as necessary.

Figure 1:
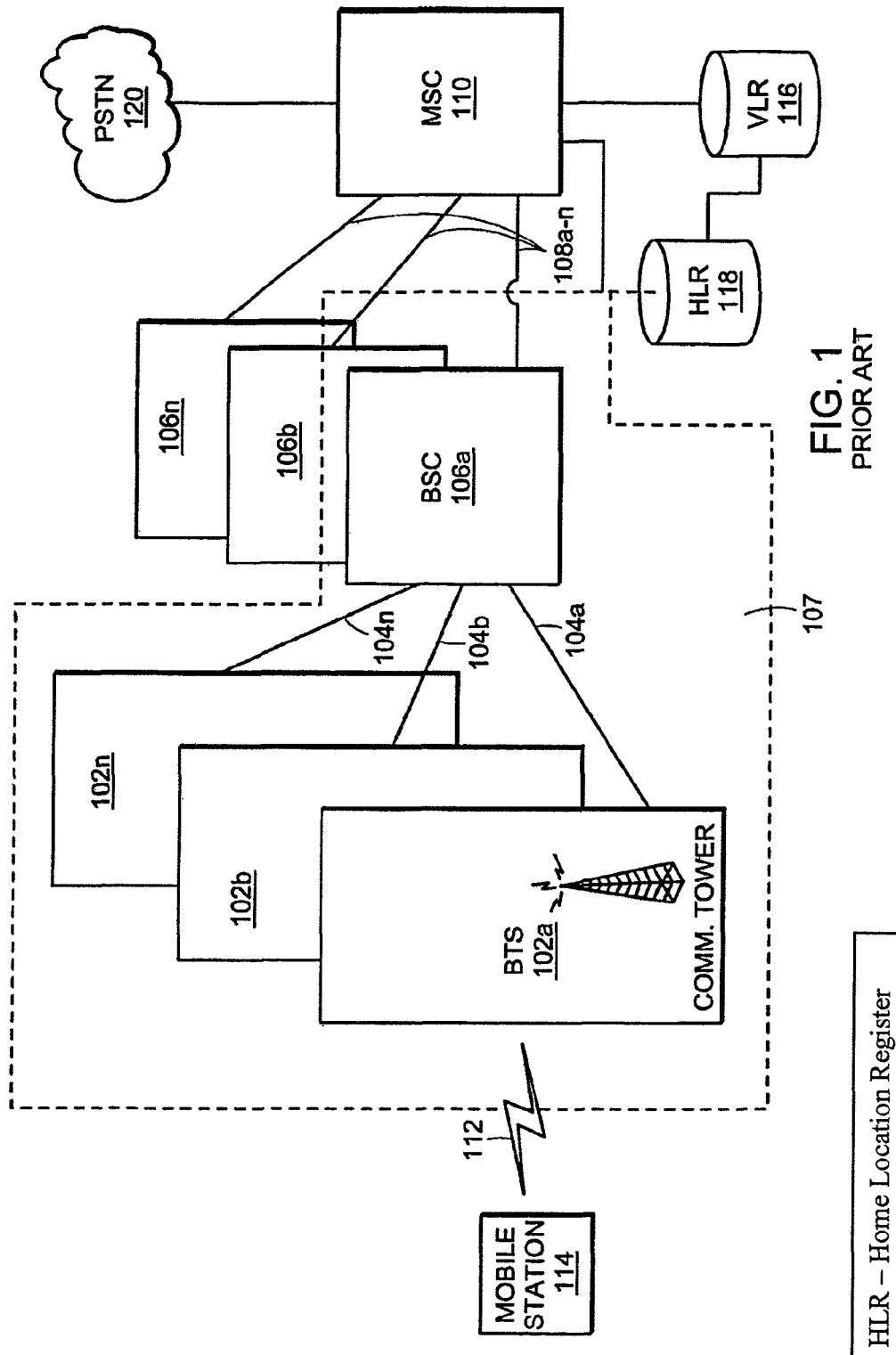
Figure 2:
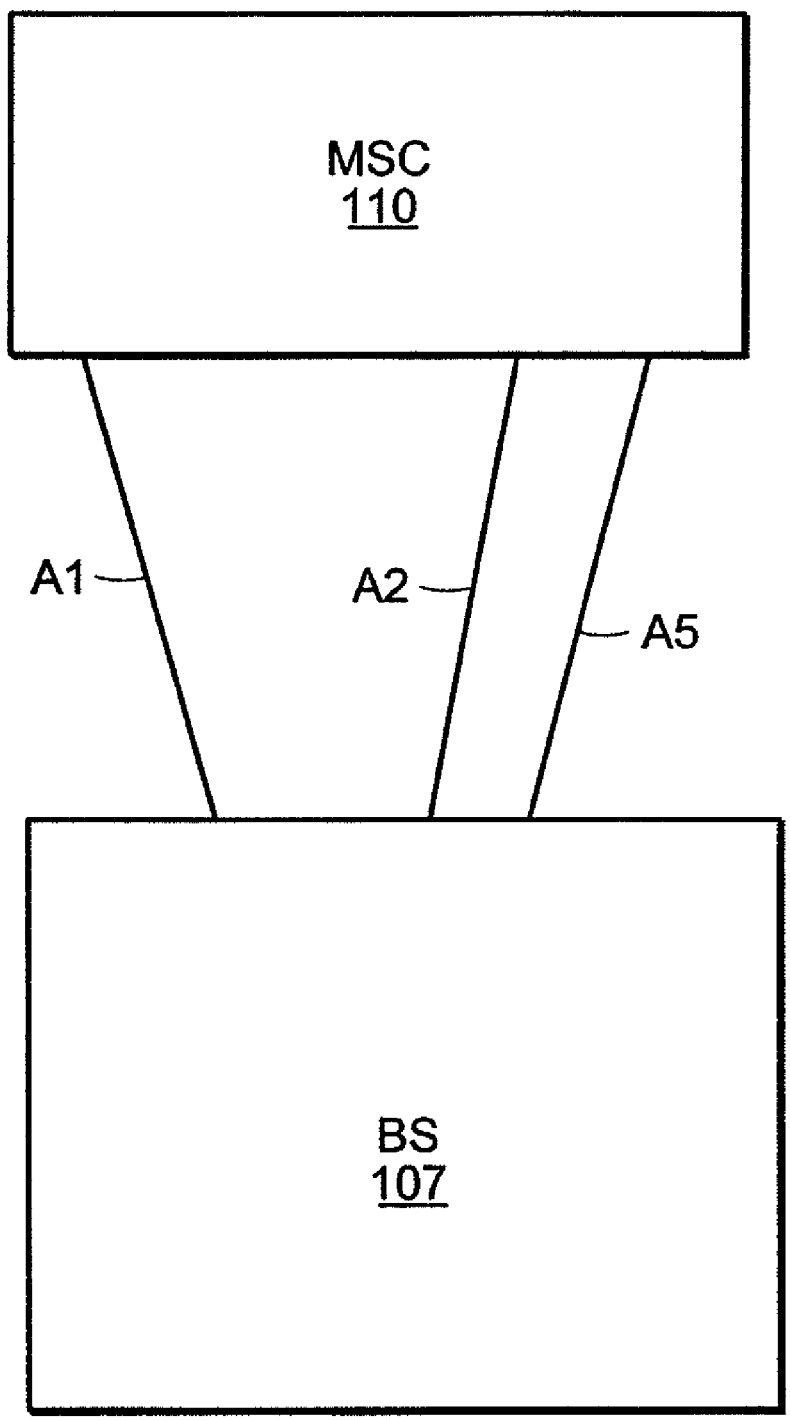
Figure 3A:
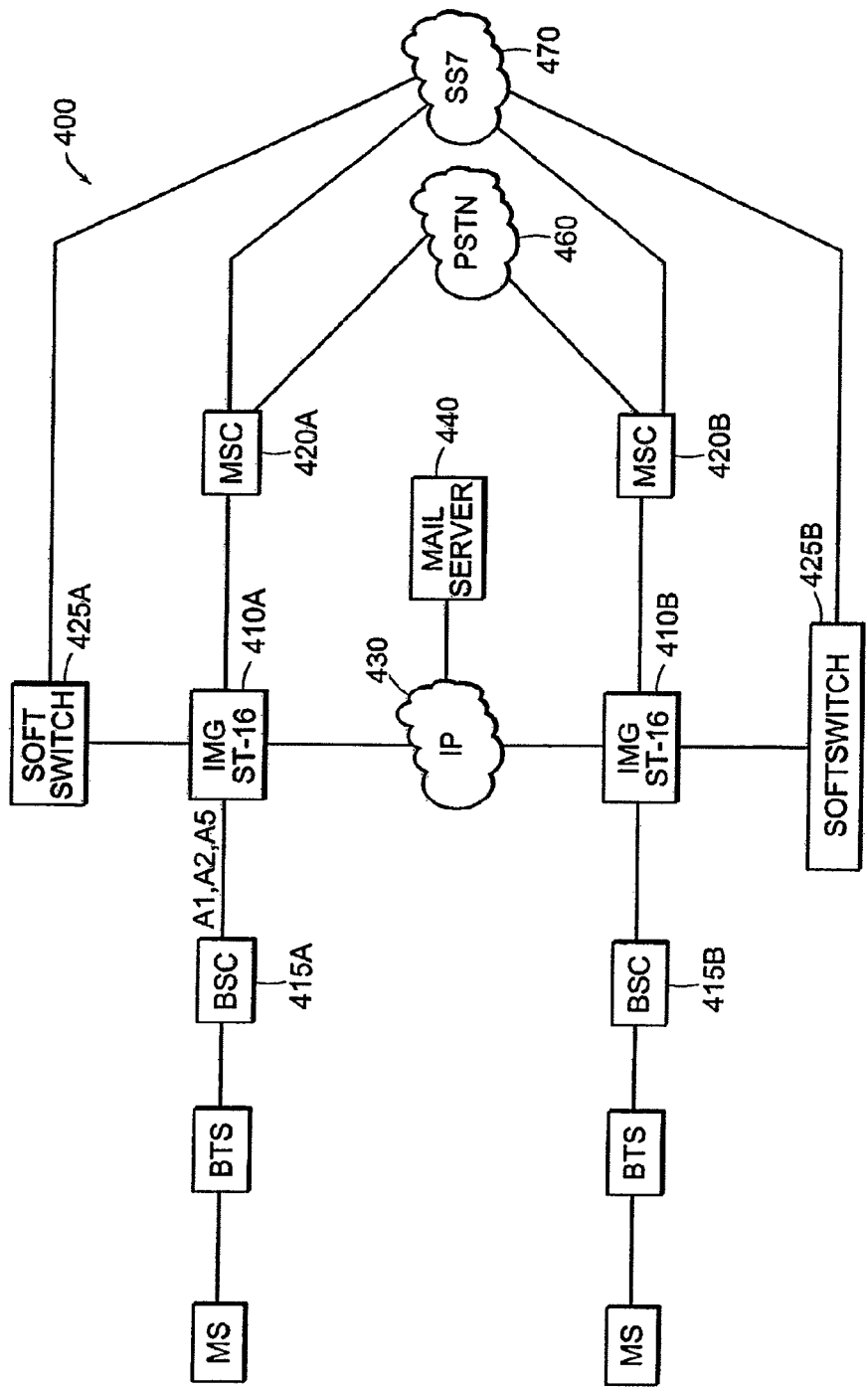
Figure 3B:
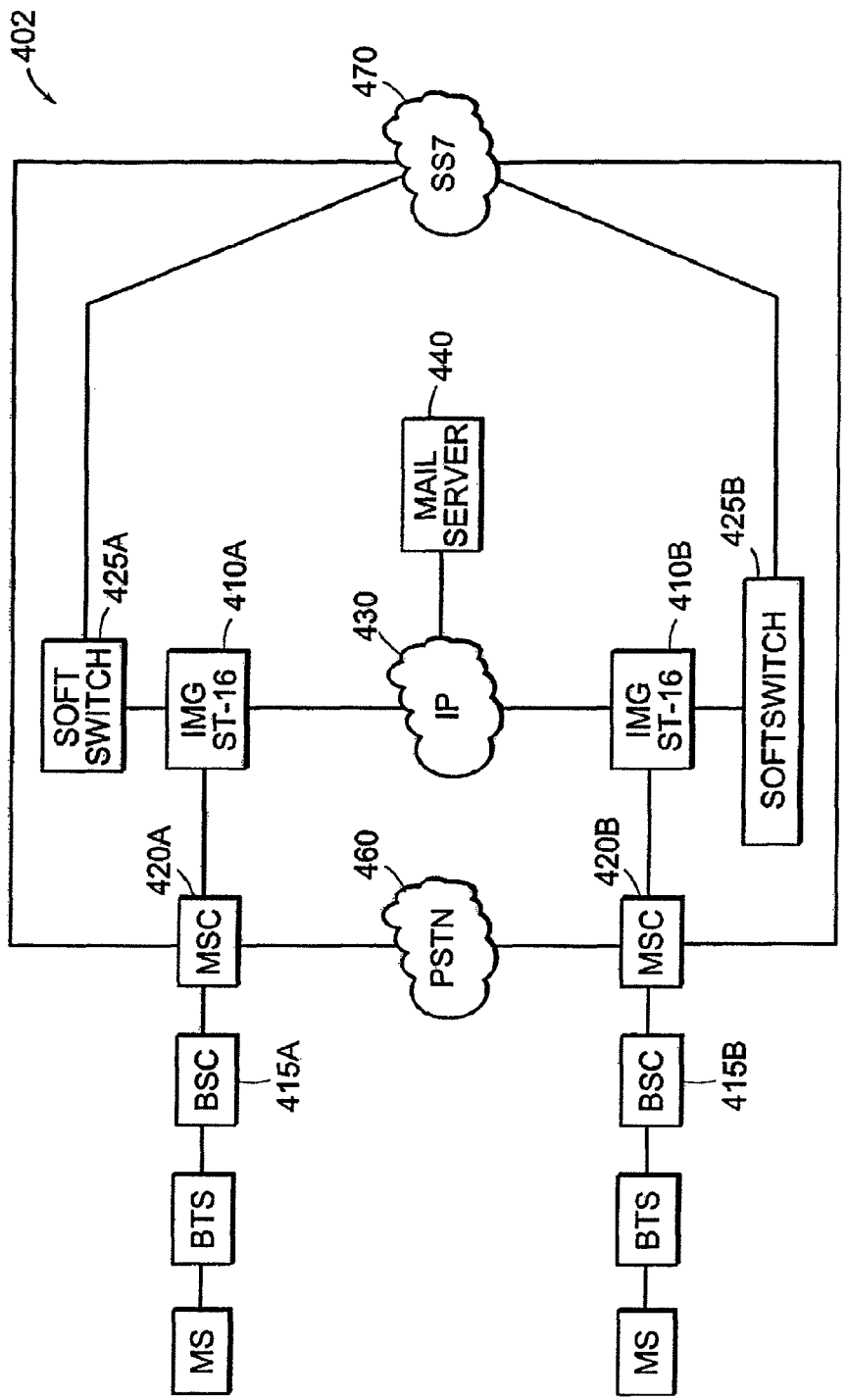

The high speed cross-point switch is provided in a communications system that has an Internet media gateway mechanism ("IMG") and a Softswitch mechanism as described below. FIG. 3A illustrates an example system 400 having an IMG 410A connected between BSC 415A and MSC 420A and communicating with a Softswitch 425A. IMG 410A communicates with BSC 415A by A1, A2, and A5 interfaces. As described below, Softswitch 425A coordinates pathway setup and communication between BSC 415A and MSC 420A through IMG 410A. IMG 410A also communicates with the Internet 430, through which IMG 410A is able to direct messages to a mail server 440, as described below. Other IMGs and Softswitches may be provided similarly in connection with other BSCs and MSCs as exemplified in FIG. 3A by IMG 410B, Softswitch 425B, BSC 415B, and MSC 420B. MSCs 420A, 420B are connected to, and can communicate with each other through, PSTN 460. SoftSwitches 425A, 425B are connected to, and can communicate with each other through, SS7 system 470. (FIG. 3B illustrates an alternative arrangement 402 in which MSC 420A is connected between IMG 410A and BSC 415A, and MSC 420B is connected between IMG 410B and BSC 415B.)

FIG. 4 illustrates a system 1010 that can support and help to provide voice and data services on one or more mobile wireless networks. In a particular implementation, system 1010 may include Starent Networks Corporation's ST-16 IMG product, which is a carrier class, high performance platform that can support multiple data types including time division multiplexed (TDM) data, Asynchronous Transfer mode (ATM) cell data, and Internet protocol (IP) packet data. The ST-16 architecture uses accelerator cards (e.g., card 1020) such as Packet Accelerator cards (PACs) for packet processing and forwarding, and Telephony Accelerator cards (TACs) for voice and TDM processing. Each PAC can perform data processing and each TAC can perform voice processing. In the ST-16, physical input/output (I/O) interfaces are terminated on industry standard line cards ("LCs") (e.g., cards 1030A, 1030B) and can carry TDM, packet or ATM cell data types in accordance with various physical interface standards. For example, LCs may be compatible with Fast Ethernet, Gigabit Ethernet, or Telco Interfaces such as OC-3c/OC-12c/OC-48 ATM/POS and DS3. Since TDM interfaces primarily carry voice traffic, TDM line cards communicate with a TAC. Ethernet line cards carry packet data traffic and can communicate with a PAC. An optical line card supports ATM cells, which can carry both voice and data traffic, and can communicate with a PAC or a TAC.

Figure 7:
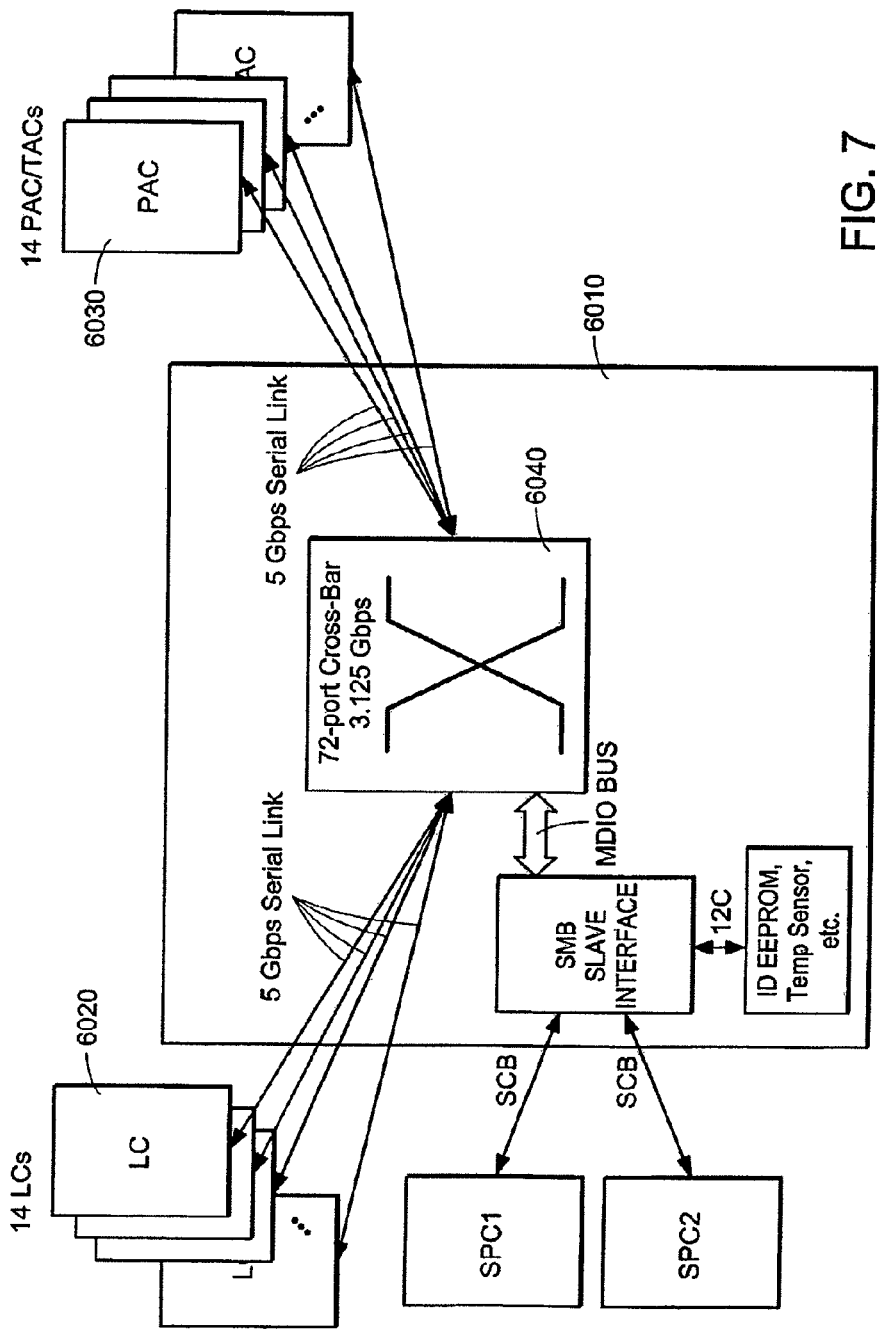
FIGS. 7, 10, 15 are block diagrams of aspects of a crossbar card.

With respect to redundancy, the ST-16 has Redundant Crossbar Cards (RCCs) (e.g., cards 1040A, 1040B) which are used to allow a line card in any slot to communicate with an accelerator cards in any slot in the ST-16, as illustrated in FIG. 7 and described below. Each RCC provides a redundant path or data/control path link between each line card and all PACs.

The ST-16 uses a card to card communication system ("STARChannel") to provide links to connect the accelerator cards to the line cards and the RCCs. In an example implementation, a STARChannel link has 4.0 Gbps data capacity and includes two physical serial links operating in channel locked mode. Each physical serial link is clocked at 2.5 Gbps (8B/10B coded) and can carry 2.0 Gbps data.

Figure 5:
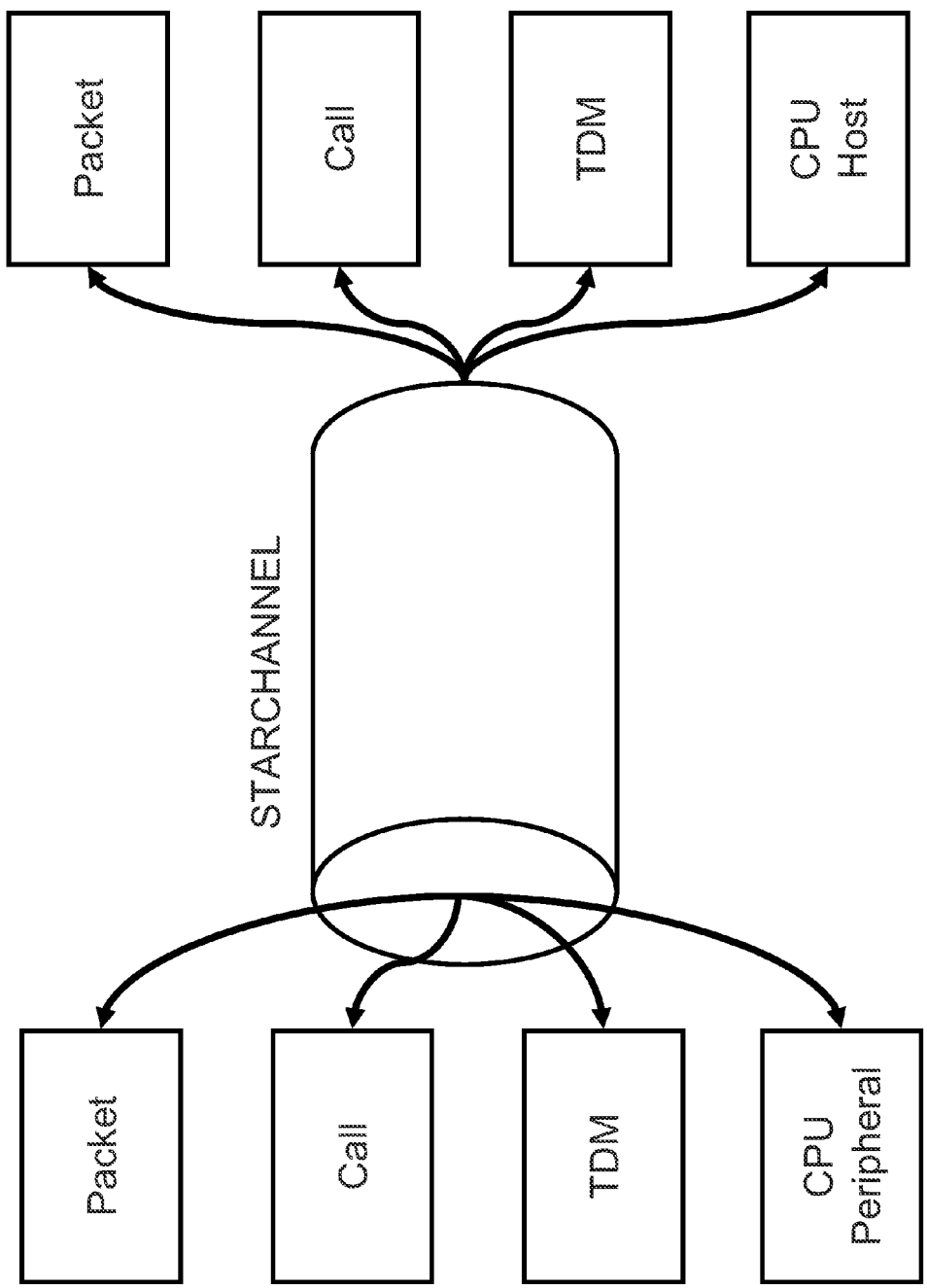
FIG. 5 is a diagram of a communications channel.

FIG. 5 shows a logical view of a single STARChannel link, which is able to carry voice, data and control traffic simultaneously in separate logical channels. The unit of transmission on the STARChannel link is a STARCell data structure cell ("STARCell"), described below. The STARChannel link uses a STARChannel protocol mechanism, also described below, to carry user data and control traffic between the line cards and accelerator cards and also provide 1:n redundancy support when used in conjunction with RCC cards.

Each STARCell includes a header field, followed by a payload field, and a trailer field. The header carries information that uniquely identifies the cell on the STARChannel. The payload field carries the voice, data, or control traffic and the trailer field contains a cyclic redundancy check (CRC-16) over the payload field.

A system side interface of STARChannel supports a defined first in first out (FIFO) interface. Proprietary and standard bus interface standards can be used to communicate across STARChannel by providing the conversion to the standard STARChannel FIFO interface at each end of STARChannel system interface. Accordingly, two incompatible bus standards can be connected across physically separate cards and redundancy connection support can also be supported.

Since the STARChannel system uses a high-speed serial interconnect, a relatively small number of pins is required for a connector on a back plane of the ST-16 compared to a typical parallel bus interface. For example (see FIG. 4), STARChannel uses 16 pins to implement a full-duplex 4.0 Gbps rate with redundancy support, which would require 140 pins with a typical parallel bus format. The STARChannel system uses high-speed differential lines to signal data between two cards. The clock to sample the data at the receiver is embedded in the signal transmitted by the transmitter, which circumventing a need to separately route the clock from one card to another card.

In the ST-16, components of STARChannel are implemented on each of the line cards and each of the accelerator cards using a Field Programmable Gate Array (FPGA) (e.g., FPGAs 1050A-1050C) and Serializer/DeSerializer (SERDES) device (e.g., SERDES 1060A-1060D). The FPGA implements STARChannel link management functions, glue logic to convert from standard bus interface to STARChannel system side interface, SERDES command and data interfaces and control, status, and statistics for the STARChannel link. The SERDES provides the parallel-to-serial, serial-to-parallel, and 8B/10B encoding/decoding functions for the STARChannel system.

In the ST-16, the accelerator card in the front slot connects to two line cards in the corresponding slots on the back plane using primary STARChannel links (e g., links 1070A, 1070B). A secondary set of STARChannel links (e.g., links 1080A-1080D) are used to connect to the RCC. The primary STARChannel links are used to directly connect the PAC and line card; the secondary STARChannel links are used to connect the PACs and the line cards through the RCCs.

As shown in FIG. 6, RCC 6010 provides a redundant path or data/control path link between each LC 6020 and all PACs/TACs 6030 via a crosspoint switch 6040 which is located on the RCC. The RCC facilitates 1:1 or 1:n redundancy of PACs or LCs without slot dependency within the chassis.

The RCC's switch 6040 includes a 72×72 port crosspoint switch capable of handling at least 2.5 Gbps of bi-directional data per chip port. Two of the ports are combined to form a logical 5 Gbps link. Each RCC connects to 14 LCs (14 slots) and 14 PACs for a total of 28 links or 56 serial 2.5-Gbps bi-directional lines.

Figure 8B:
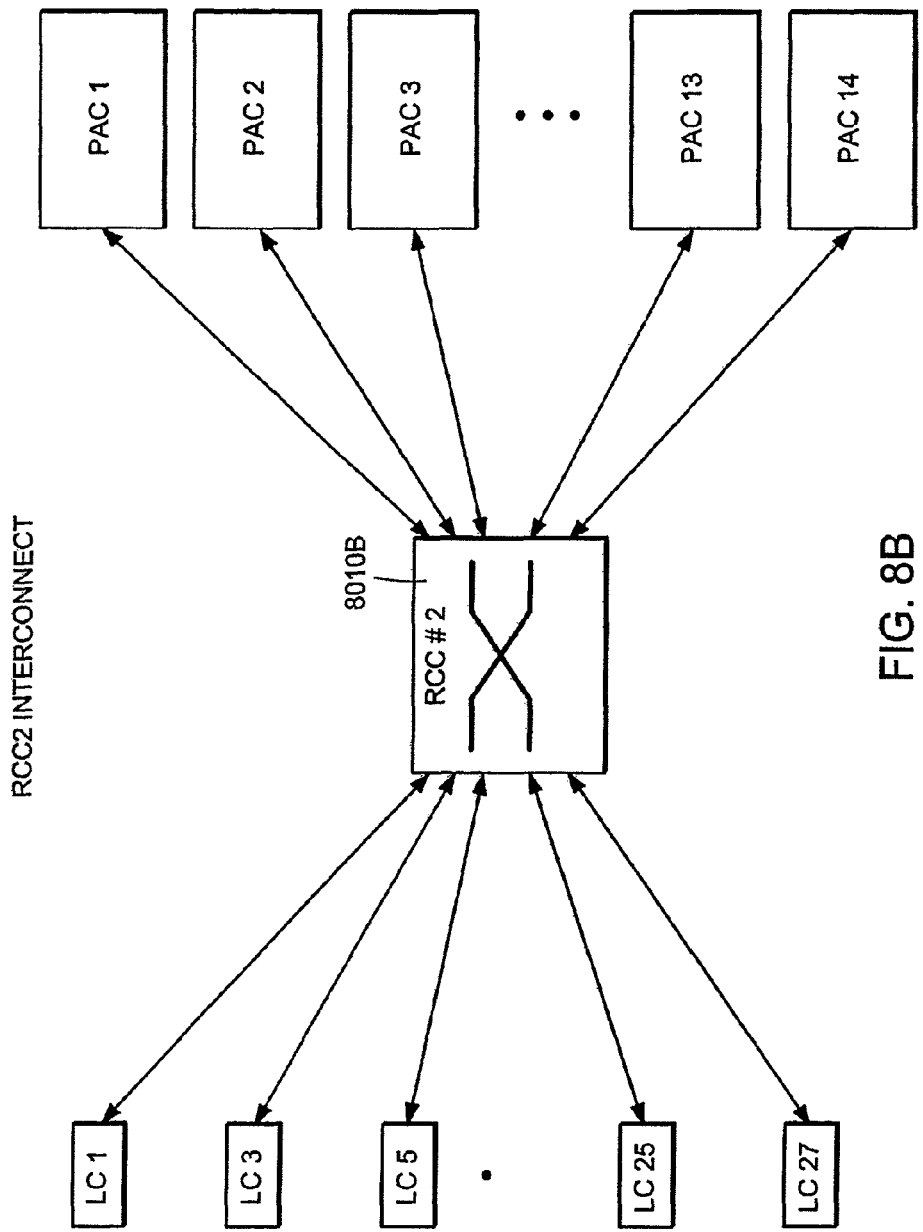
Figures 9, 9A:
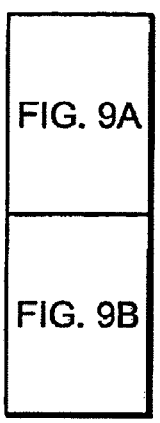

With reference to FIGS. 8A-8B, and to FIG. 9 which illustrates port mapping, in a specific implementation, two RCCs 8010A, 8010B (labeled as RCC1, RCC2 respectively) are located in the ST-16, specifically in the rear center of the ST-16 chassis in a slot directly behind switch processing cards (SPCs), which provide system management and switching functions, and below management input output (SPIO) cards which provide cabling and physical ports to the user for the associated SPC. Each RCC is a half height card similar to the LC and SPIO cards. As shown in FIGS. 8A-8B, RCC1 is connected to the even numbered LC slots and RCC2 is connected to the odd numbered LC slots. The second RCC2 is only required when one of the odd LC slots (second LC slot) is used in the system. In the specific implementation, the RCCs are not redundant to each other.

Figure 10:
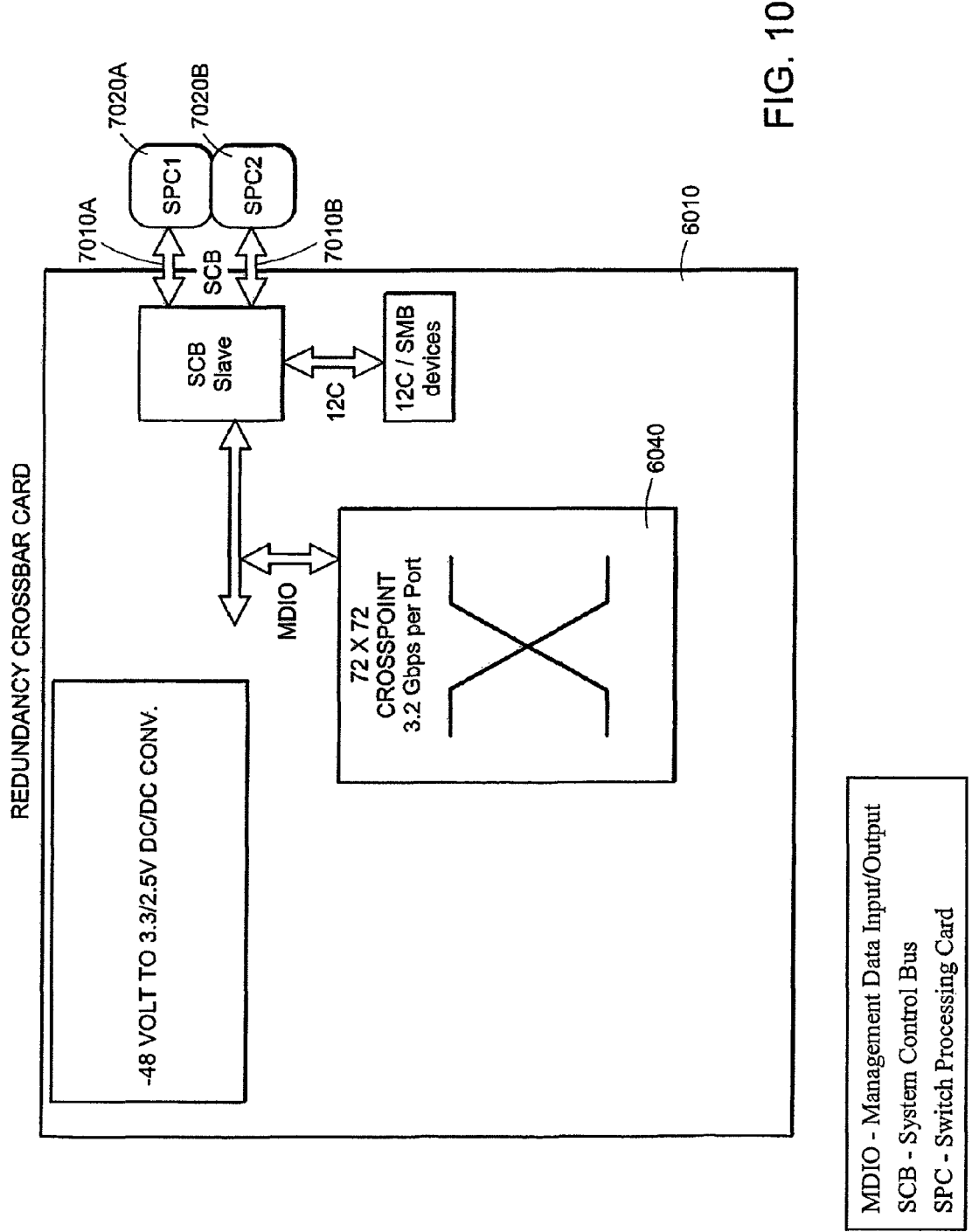

As illustrated in FIG. 10 which shows RCC busses and SPC to RCC control, the primary SPC configures both RCCs 6010 via a simple low-pin count System Control Bus (SCB) to MDIO (802.3ae serial interface) interface. In the specific implementation, two separate SCB busses 7010A, 7010B are provided to each RCC 6010, one SCB bus from each SPC 7020A, 7020B for redundancy.

A primary channel carries periodic background test packets to detect and isolate hardware failures in the event of light traffic. Standby channels pass diagnostic traffic to detect failures to help prevent "silent" failures. Such traffic is generated by the FPGA hardware automatically.

In a specific implementation, the RCC may use a Velio VC3002 crosspoint switch (by Velio Communications) to provide the redundancy interconnects between the PACs and LCs. The VC3002 has at least the following features:

72 I/O lanes at 0.95-3.125 Gbps (optionally 0.622-3.125 Gbps)
    Clock and Data Recovery (CDRs) on every serial input
    Transmit pre-emphasis on each serial output
    Serial rate programmable on a per lane connection
    Self-Test with Pseudo Random Bit Sequence (PRBS) Generation/Checking on a per port basis.
    MDIO/MDC Serial Interface to internal registers
    Option to power down any unused lanes for power consumption
    3 different PECL clock inputs for increased flexibility on serial rate configuration
    1.8V core voltage
    1.8V serial I/O voltage (CML serial I/O technology)
    2.5-3.3V control I/O voltage (LVCMOS control interface technology)
    37.5 mm×37.5 mm array flip-chip BGA
    On chip terminations for serial I/O The VC3002 device provides a serial register access interface that is compatible with MDIO, MDC of 802.3ae. The VSC3002 MDIO interface is accessed by translating commands from SCB format to MDIO format, which translation is performed by a Slave SCB FPGA.

Each read and write access takes two steps to complete. The first step is an address cycle followed by either the read or write command. FIG. 11 shows a bitstream format (MDIO command format) for a VC3002 MDIO register access. FIG. 12 illustrates timing diagrams of sample register accesses (MDIO access).

In a specific implementation, it is advantageous if: the lower 4 PRTAD bits equal the AD[15:12] self-address pins, for the transaction to be effective; the leftmost PRTAD bit is 0; indirect addressing is used; the 12 lower bits of the 16-bit register are presented during the address cycle at the address/data bits; the upper 4 bits of the 16-bit address/data stream are 1000 h; during read or write cycles, the upper 8-bits of data are ignored; and the serial stream's DEVAD bits match 10000b, for the transaction to be effective.

Figure 13:
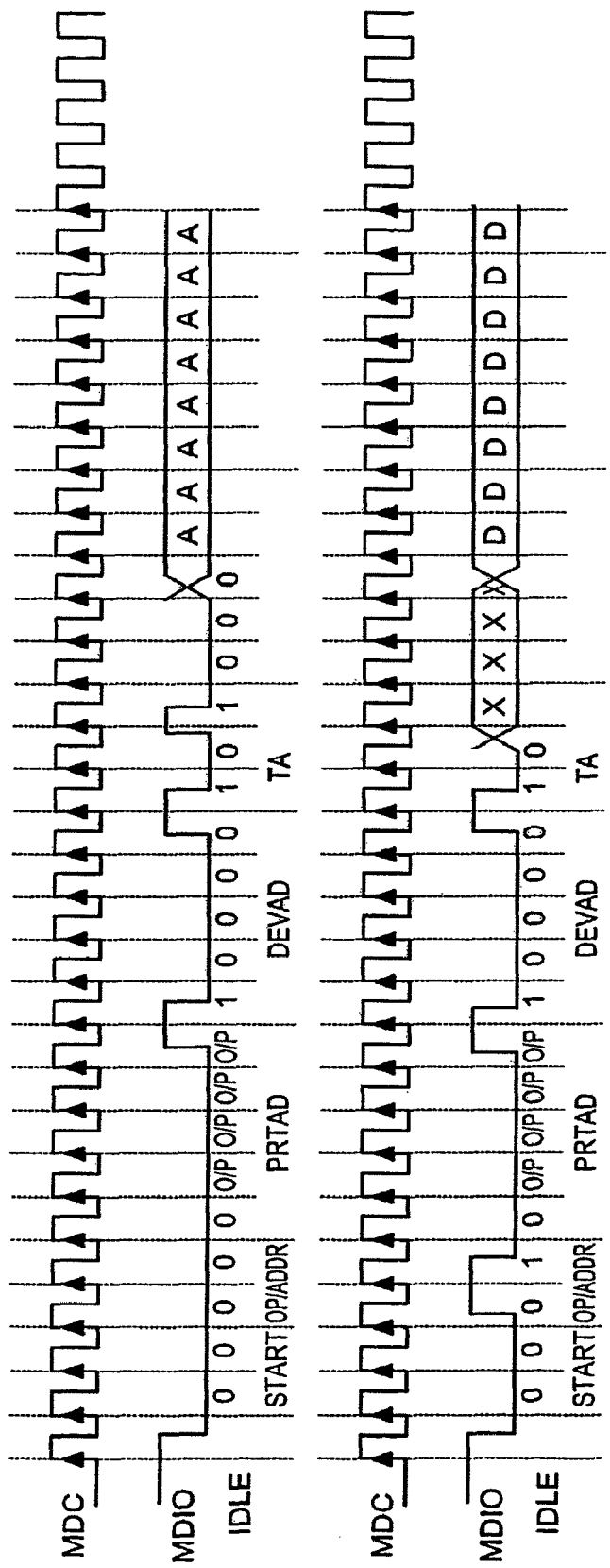

With respect to the specific implementation, FIG. 13 illustrates the timing requirements for a MDIO access (MDIO interface static timing).

The RCC may use the VC3002's Built In Self Test (BIST) features. Each port of the VC3002 has BIST generators and checkers which may be used to test the integrity of each link When BIST is enabled, the deserializer module continuously monitors the incoming serial stream for a pseudo random bit sequence (PRBS) pattern. When the desired PRBS pattern is not detected, the VC3002's TSTR output is set. The PRBS sequence is generated by the polynomial $X^{10}+X^{7}+1$. BIST is enabled on a port by setting the TSTI bit HIGH in the GXBSOC register for the corresponding lane; exercising the GXBCSR register for all lanes, waiting, and checking the TSTR pin/bit for errors.

With reference to FIG. 14 which illustrates use of pre-emphasis and amplitude control values, the RCC may use the VC3002's transmit pre-emphasis/transmit amplitude control. The VC3002 has pre-emphasis controls on each of its outputs, which can be helpful in maintaining the signal waveform and data pattern at the receiving device (e.g., Velio VSC7226). In addition to pre-emphasis, each output has signal amplitude control in order to reduce the signal swing along with power and EMI. Pre-emphasis and amplitude controls are programmed by writing M/K/E values into HSM bits in the GXBSOL registers.

Figure 15:
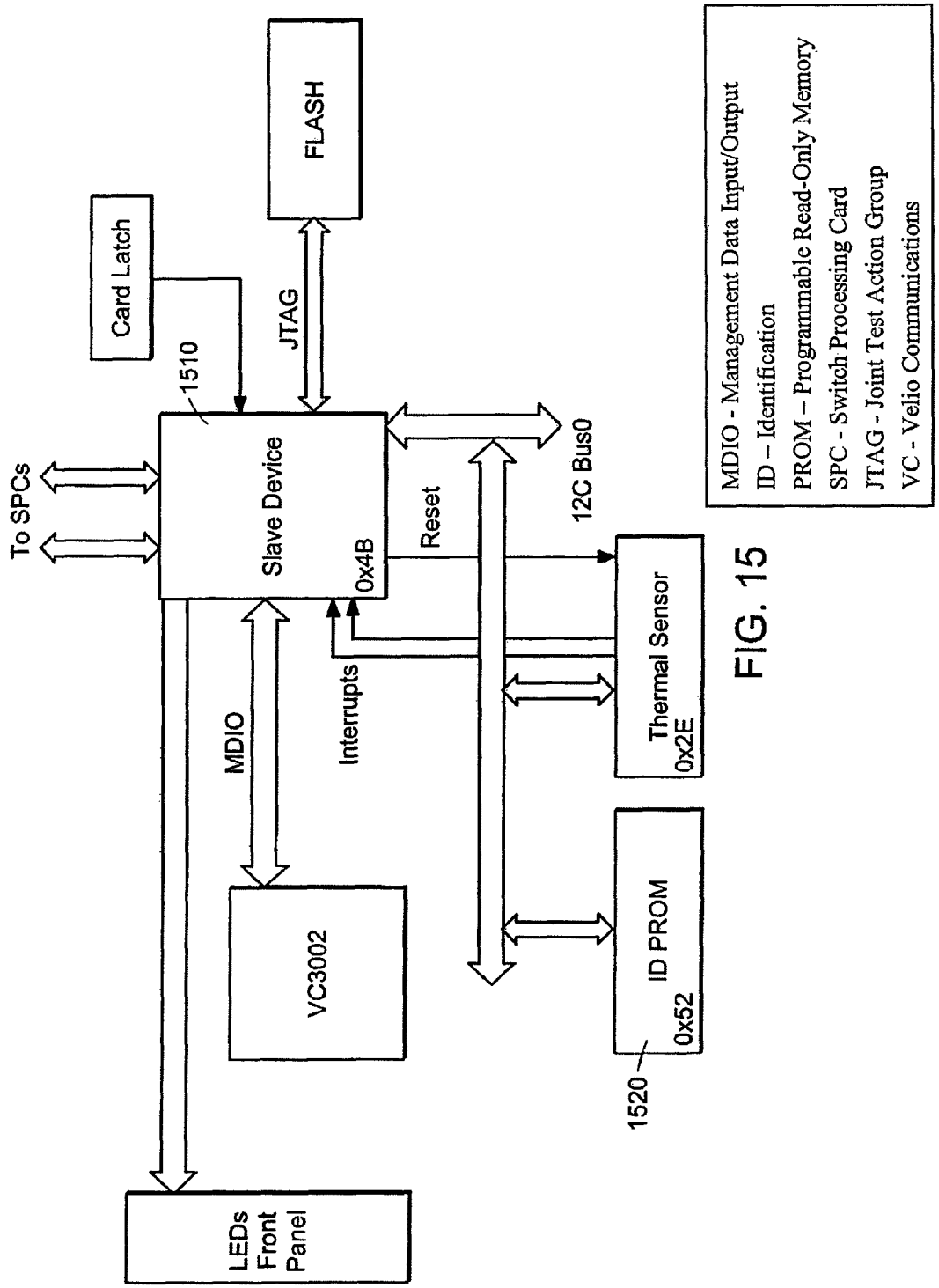

As illustrated in a system control bus (SCB) sub-system block diagram in FIG. 15, the SCB provides a means for the SPC to monitor and control the status of the RCC. Each RCC contains an SCB slave device 1510 that receives and responds to messages from the master SPC. The master SPC is determined by a signal on the chassis backplane.

In general, the SCB commands can communicate with SCB slave registers, I2C (2 wire serial interface proposed by Philips Semiconductor) bus devices, or to add-on SCB functionality such as configuration FLASH memory updates. If the signal header is not corrupted and is determined to be valid, the appropriate interface is enabled. If the command is for the I2C bus, devices such as IDPROM and temperature sensors can be accessed to monitor status. The SCB slave device may be implemented in a Spartan-II FPGA, for compatibility with the SCB master device and to meet hot-swap and gate count requirements.

Each device on the I2C Bus0 has a unique I2C address, which is shown in FIG. 15 in the lower left hand corner of each block (e.g., 0x52 for block 1520). In a specific implementation, 0x10010xx may be selected for the FPGA and slave device, as System Management Bus (SMB) protocol defines these addresses for prototyping purposes. In the specific implementation, each of the FPGA and the slave device has a register that allows a default value to be overridden if it conflicts with future addresses. FIG. 16 identifies, for the specific implementation, parts used and their I2C addresses.

The SCB slave device has a status and register ports that are used for controlling status LEDs, monitoring board presence and interrupt status, and controlling board resets. In the specific implementation, LEDs and resets are driven from the BD_LED and BD_RST ports, respectively, and the BD_STAT and BD_INT ports are used to monitor board status. Bit and signal definitions for SCB slave control and status lines are shown in FIG. 17.

In the specific implementation, a board status indicator has a red/green LED at the top for a board bad/good indication and a green LED for ACTIVE status indication.

With respect to the RCC's functional memory map (see FIG. 18), in the specific implementation, each RCC has 3 different regions of memory which are accessed by the SPC through the SCB bus: local SCB slave memory region; local I2C memory region (e.g., for IDEEPROM, monitor); and VC3002 memory region (SCB to MDIO interface). In the case of the local SCB slave memory region, the address map has functional blocks that can expand as necessary; regions of unused memory may be scattered about. In FIG. 18, the format of the table shows main functional blocks in bold with sub-blocks in normal script. For example, all board related information resides in the bottom 32 registers of the memory space; board status resides in register addresses with the MSBs equal to 3'b000.

In FIG. 18, notation "S/C" refers to status/control: for bit 5, 0 signifies status and 1 signifies control. "Type" refers to the different applications or functions that can map to the space. In the Add-on and Diag. Mailbox space, room remains for more types of services or uses. The diagnostics areas have read-writable registers as well as read only registers. In the specific implementation, addresses with 0x11001xx can only be read by SCB and written by the I2C ports, and addresses with 0x11011xx can only be read by the I2C ports and written to by the SCB port.

The specific implementation has specific registers as shown in FIG. 19 (register description) and FIG. 20 (VC3002 memory map) with address and bit location listed along with name and description. Bit 0 is the LSB and 7 is the MSB. Bit definitions relying on input or output pins can vary from board to board; the values in FIGS. 19-20 relate to the specific implementation based on line cards.

With reference to FIG. 21 which illustrates midplane signal connections, the RCC has several midplane connections to various boards in the chassis. The line cards transmit and receive data from the PAC for the primary data path and the RCC for the secondary data path. The data path connections are provided over two lockstep high-speed serial links capable of supporting in excess of OC-48 throughput. The RCC also connects to the SPC cards for system control and monitoring via a system control bus (SCB) to each board. The RCC also has connections to the mid-plane for power, board presence detect, and slot identification.

On the RCC, in the case of clock generation, the VC3002 provides for 3 different LVPECL reference clock inputs: RFCA, RFCB, and RFCC. Each of the clock inputs has a programmable clock multiplier option (4×, 8×, 10×, 16×, and 20×). In order to set the rate for a particular port, the GXBDR register is programmed. Both the Oscillator reference clock input and the clock multiplier value are programmed in the GXBDR register. The VC3002 has the following clock requirements in order for the deserializer (DES) to bit-lock: Local REFCLK is +/−20 ppm for SONET frames and is +/−100 ppm for 8b/10b encoded packets.

In the specific implementation, each main component of the RCC contains test functionality that allows diagnostics to identify problems on a per component basis.

Figure 22:
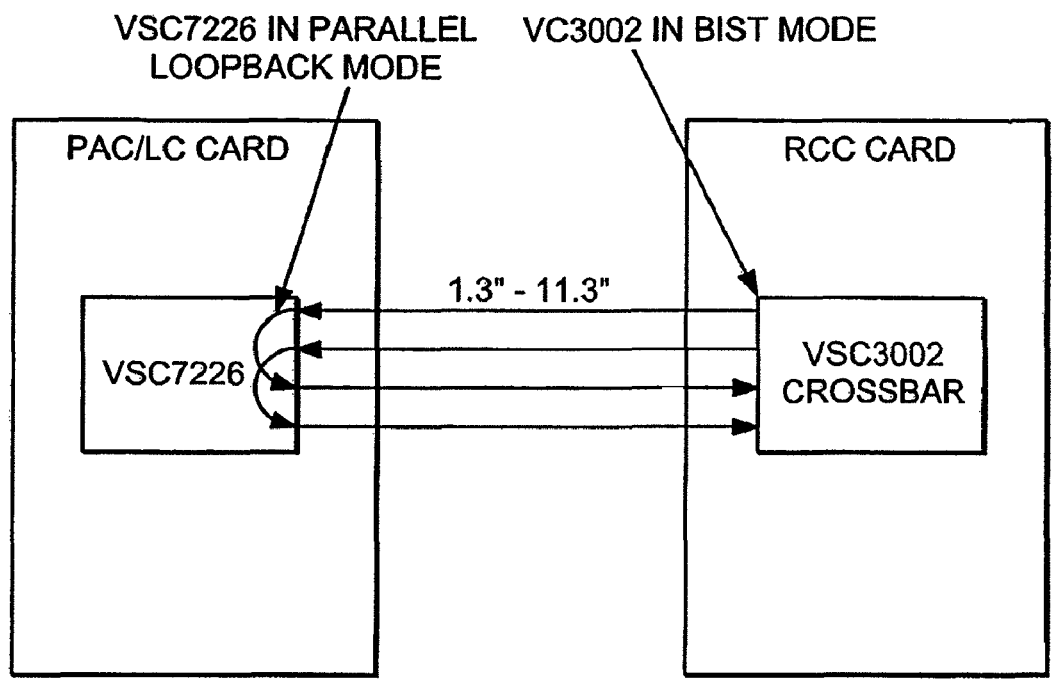
FIG. 22 illustrates loopback testing of a crossbar card.

As noted above, the VC3002 has BIST capability, which can be used to test many or all of the RCC/PAC/LC high speed serial links on the midplane, and for online diagnostics within the system while operational. With respect to FIG. 22 which illustrates VC3002 BIST loopback testing, in order to perform a test, the following steps are taken: putting the VSC7226 on LC/PAC in parallel loopback, enabling BIST on VC3002, and monitoring the high speed serial link for errors.

Figure 23:
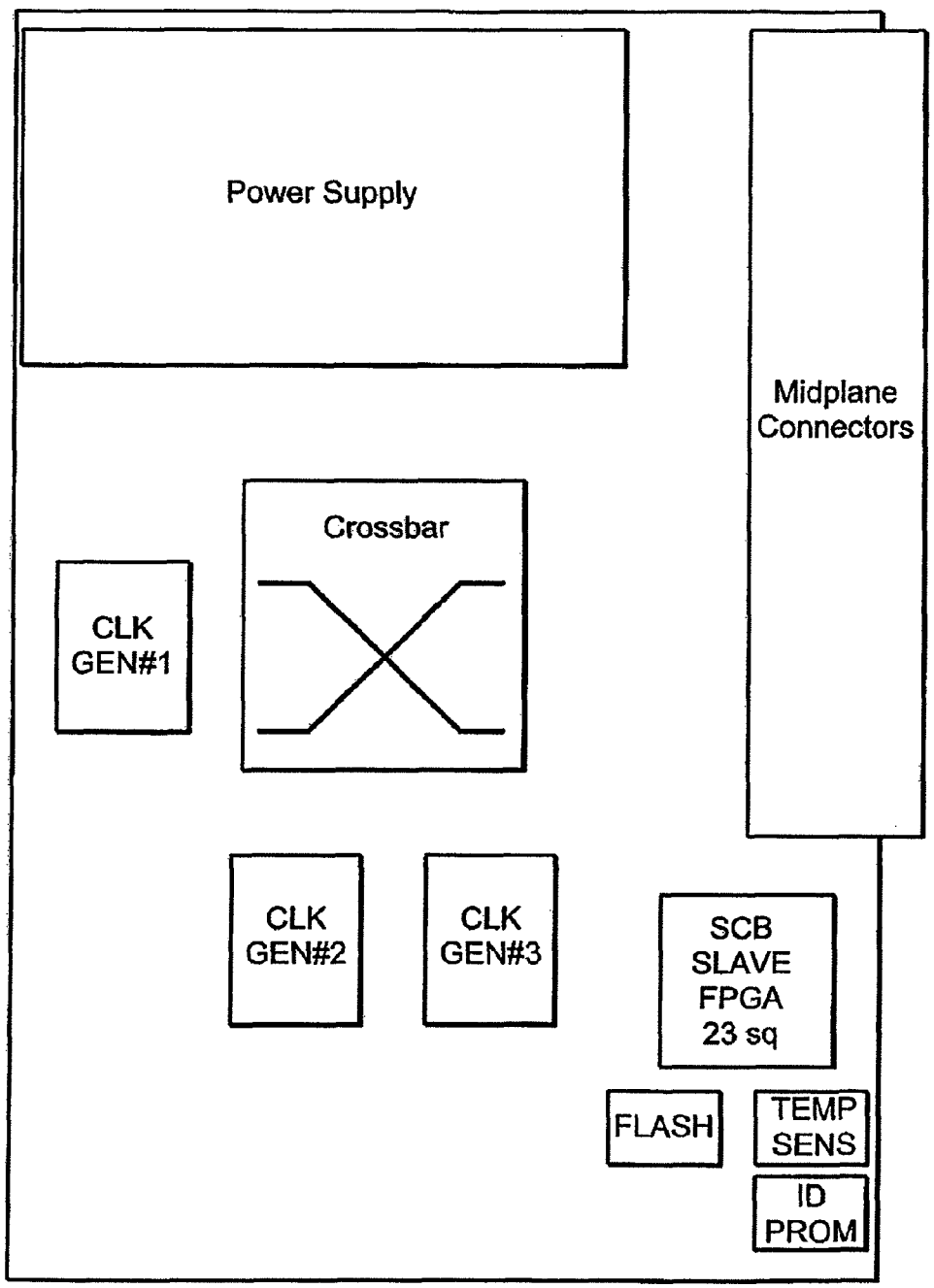
FIG. 23 is a block diagram of a component placement of a crossbar card.

With respect to space constraints in the specific implementation, FIG. 23 shows an RCC board floor plan having restricted areas for supply and connectors. It is advantageous if the back of the RCC board is used and critical paths such as the SERDES serial signal path are short and direct. In the specific implementation, miscellaneous items such as ID PROM, temperature sensor, latch, can be placed as convenient.

In addition, it is advantageous if one or more of the following guidelines are followed at least to some degree: keeping power and ground noise levels below 50 mV; filtering analog power circuits, filtering and shielding DC-DC converters, and oscillators; using 4.7-10 uF between power and ground, using 0.01 uF capacitors to reduce high-frequency noise; avoiding breaks in the ground plane, particularly when shielding signals; routing high-speed signals above a continuous, unbroken ground plane; using signal layer filling; in differential signal layout, keeping traces of the pair identical or nearly identical where possible, avoiding the use of vias and layer changes, spacing apart transmit and receive pairs by running orthogonal traces or separating traces with a ground plane layer; and, in clock layout, keeping traces short, keeping lines point-to-point, and terminating traces with series termination.

Other embodiments are within the scope of the following claims. For example, multiple crosspoint switch devices may be used. The RCC may include fully, substantially, or partially autonomous on-board switching determination analysis capability. Wireless or other communication may be used to communicate with the RCC. Generic or special purpose logic circuitry or devices may be used in place of or in addition to at least part of the crosspoint switch device, to perform cross connections.

What is claimed is:

1. An apparatus comprising:
    an interface circuit for sending and receiving information over an interface;
    a processing circuit in direct communication with the interface circuit for processing information received from the interface circuit; and
    a crosspoint switch in communication with the interface circuit and in communication with the processing circuit, the crosspoint switch providing a redundant communications path between the interface circuit and the processing circuit upon failure of the direct communication;
    wherein the direct communication does not pass through the crosspoint switch.

2. The apparatus of claim 1, wherein the interface circuit comprises a line card.

3. The apparatus of claim 1, wherein the processing circuit comprises an accelerator card.

4. An apparatus comprising:
    at least two interface circuits including a first interface circuit and a second interface circuit for sending and receiving information over interfaces;
    at least two processing circuits including a first processing circuit and a second processing circuit, the first processing circuit in direct communication with the first interface circuit and for processing information received from the first interface circuit, the second processing circuit in direct communication with the second interface circuit and for processing information received from the second interface circuit; and
    a crosspoint switch in communication with the at least two interface circuits and in communication with the at least two processing circuits, the crosspoint switch providing a redundant communications path between the first interface circuit and the first processing circuit upon failure of the direct communication between the first interface circuit and the first processing circuit and providing a redundant communications path between the second interface circuit and the second processing circuit upon failure of the direct communication between the second interface circuit and the second processing circuit;
    wherein the direct communication between the first interface circuit and the first processing circuit does not pass through the crosspoint switch and wherein the direct communication between the second interface circuit and the second processing circuit does not pass through the crosspoint switch.

5. The apparatus of claim 4, wherein the first interface circuit and second interface circuit each comprises a line card and the first processing circuit and second processing circuit each comprises an accelerator card.

6. The apparatus of claim 5,
    the at least two interface circuits including at least one packet traffic line card carrying primarily packet traffic and at least one voice traffic line card carrying primarily voice traffic;
    the at least two processing circuits including at least one packet processing accelerator card and at least one voice processing accelerator card;
    wherein packet traffic line cards are in direct communication with packet processing accelerator cards and voice traffic line cards are in direct communication with voice processing accelerator cards; and
    wherein the crosspoint switch is programmable to provide:
        a redundant communication path between a particular one of the at least one packet traffic line card and a particular one of the at least one packet processing accelerator card; and
        a redundant communication path between a particular one of the at least one voice traffic line card and a particular one of the at least one voice processing accelerator card.

7. An apparatus comprising:
    at least two interface circuits including a first interface circuit and a second interface circuit for sending and receiving information over interfaces;
    at least two processing circuits including a first processing circuit and a second processing circuit, the first processing circuit in direct communication with the first interface circuit and for processing information received from the first interface circuit, the second processing circuit in direct communication with the second interface circuit and for processing information received from the second interface circuit; and
    a crosspoint switch in communication with the at least two interface circuits and in communication with the at least two processing circuits, the crosspoint switch providing a redundant communications path between each of the at least two interface circuits and any one of the at least two processing circuits upon failure of the direct communication between an interface circuit of the at least two interface circuits and a processing circuit of the at least two processing circuits;

wherein the direct communication between the first interface circuit and the first processing circuit does not pass through the crosspoint switch and wherein the direct communication between the second interface circuit and the second processing circuit does not pass through the crosspoint switch.

8. The apparatus of claim 7, wherein the first interface circuit and second interface circuit each comprises a line card and the first processing circuit and second processing circuit each comprises an accelerator card.

9. The apparatus of claim 7, the at least two interface circuits including at least one packet traffic line card carrying primarily packet traffic and at least one voice traffic line card carrying primarily voice traffic;

the at least two processing circuits including at least one packet processing accelerator card and at least one voice processing accelerator card;

wherein packet traffic line cards are in direct communication with packet processing accelerator cards and voice traffic line cards are in direct communication with voice processing accelerator cards; and wherein the crosspoint switch is programmable to provide:
 a redundant communication path between a particular one of the at least one packet traffic line card and a particular one of the at least one packet processing accelerator card; and
 a redundant communication path between a particular one of the at least one voice traffic line card and a particular one of the at least one voice processing accelerator card.

* * * * *